US012586587B2

(12) United States Patent
Lee

(10) Patent No.: US 12,586,587 B2
(45) Date of Patent: Mar. 24, 2026

(54) METHOD FOR ANALYZING USER UTTERANCE BASED ON UTTERANCE CACHE AND ELECTRONIC DEVICE SUPPORTING THE SAME

(71) Applicant: SAMSUNG ELECTRONICS CO., LTD., Suwon-si (KR)

(72) Inventor: Dongyul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 18/378,997

(22) Filed: Oct. 11, 2023

(65) Prior Publication Data

US 2024/0119941 A1     Apr. 11, 2024

Related U.S. Application Data

(63) Continuation of application No. PCT/KR2023/015635, filed on Oct. 11, 2023.

(30) Foreign Application Priority Data

Oct. 11, 2022    (KR) ........................ 10-2022-0129461
Nov. 4, 2022    (KR) ........................ 10-2022-0146062

(51) Int. Cl.
    *G10L 15/30*       (2013.01)
    *G10L 15/18*       (2013.01)
            (Continued)

(52) U.S. Cl.
    CPC ........ *G10L 15/285* (2013.01); *G10L 15/1815* (2013.01); *G10L 15/22* (2013.01); *G10L 15/30* (2013.01); *G10L 2015/223* (2013.01)

(58) Field of Classification Search
    CPC ... G10L 15/285; G10L 15/1815; G10L 15/22; G10L 15/30; G10L 2015/223; G10L 15/16
            (Continued)

(56) References Cited

U.S. PATENT DOCUMENTS

2003/0046077 A1    3/2003   Bakis et al.
2010/0076750 A1*   3/2010   Cosatto ............... G06F 16/9577
                                            704/270.1
                 (Continued)

FOREIGN PATENT DOCUMENTS

CN       112201236 A   *   1/2021   ............. G10L 15/22
JP        2010-91829 A     4/2010
                 (Continued)

OTHER PUBLICATIONS

International Search Report (PCT/ISA/210) issued on Jan. 18, 2024 by the International Searching Authority in International Patent Application No. PCT/KR2023/015635.
(Continued)

*Primary Examiner* — Abul K Azad
(74) *Attorney, Agent, or Firm* — Sughrue Mion, PLLC

(57) ABSTRACT

An electronic device includes: a communication interface; a memory including an utterance cache; and at least one processor operatively connected to the communication interface and the memory, wherein the at least one processor is configured to: identify whether an input utterance corresponds to one or more cached utterances stored in the utterance cache; based on identifying that the input utterance corresponds to the one or more cached utterances, transmit the input utterance to an external electronic device through the communication interface; identify whether an operation corresponding to the input utterance is executable by the electronic device; based on the operation being identified to
(Continued)

600 be executable by the electronic device, execute the operation; and based on the operation being identified not to be executable by the electronic device, transmit the input utterance to the external electronic device through the communication interface and add the input utterance to the utterance cache.

18 Claims, 12 Drawing Sheets

(51) Int. Cl.
*G10L 15/22* (2006.01)
*G10L 15/28* (2013.01)

(58) Field of Classification Search
USPC ............................................. 704/270.1, 275
See application file for complete search history.

(56) References Cited

U.S. PATENT DOCUMENTS

| | | | |
|---|---|---|---|
| 2015/0161204 A1 | 6/2015 | Kim | |
| 2017/0068550 A1* | 3/2017 | Zeitlin | .................... G06F 3/167 |
| 2020/0013388 A1 | 1/2020 | Lee et al. | |
| 2020/0349947 A1 | 11/2020 | Kim et al. | |
| 2021/0065694 A1 | 3/2021 | Li | |
| 2021/0074286 A1 | 3/2021 | Cotting et al. | |
| 2021/0117151 A1* | 4/2021 | Cho | ........................ G10L 15/22 |
| 2021/0375281 A1* | 12/2021 | Gao | ...................... G10L 15/083 |
| 2022/0254340 A1* | 8/2022 | Navarro | ............. H04L 63/0861 |
| 2022/0358925 A1 | 11/2022 | Park et al. | |
| 2023/0410803 A1 | 12/2023 | Alon et al. | |

FOREIGN PATENT DOCUMENTS

| | | |
|---|---|---|
| JP | 2020-166074 A | 10/2020 |
| KR | 10-2011-0052269 A | 5/2011 |
| KR | 10-2015-0068003 A | 6/2015 |
| KR | 10-2019-0087353 A | 7/2019 |
| KR | 10-2019-0090424 A | 8/2019 |
| KR | 10-2021-0045241 A | 4/2021 |
| KR | 10-2021-0147027 A | 12/2021 |
| KR | 10-2022-0057249 A | 5/2022 |
| KR | 10-2023-0117239 A | 8/2023 |
| KR | 10-2023-0137488 A | 10/2023 |
| KR | 10-2024-0089669 A | 6/2024 |

OTHER PUBLICATIONS

Written Opinion (PCT/ISA/237) issued on Jan. 18, 2024 by the International Searching Authority in International Patent Application No. PCT/KR2023/015635.

* cited by examiner

METHOD FOR ANALYZING USER UTTERANCE BASED ON UTTERANCE CACHE AND ELECTRONIC DEVICE SUPPORTING THE SAME

CROSS-REFERENCE TO RELATED APPLICATION(S)

This application is a by-pass continuation application of International Application No. PCT/KR2023/015635, filed on Oct. 11, 2023, which is based on and claims priority to Korean Patent Application Nos. 10-2022-0129461, filed on Oct. 11, 2022, and 10-2022-0146062, filed on Nov. 4, 2022, in the Korean Intellectual Property Office, the disclosures of which are incorporated by reference herein their entireties.

BACKGROUND

1. Field

The disclosure relates to a method for analyzing a user utterance and processing the user utterance based on an utterance cache and an electronic device performing the method.

2. Description of Related Art

Portable digital communication devices have become a must-have item for everyone in modern era. Users desire to receive various high-quality services anytime, anywhere using the portable digital communication devices.

A speech recognition service may provide a user with various content services corresponding to the user's speech received based on a speech recognition interface implemented on portable digital communication devices. In order to provide speech recognition services, the portable digital communication devices may be implemented with technologies that recognize and analyze human language, such as automatic speech recognition, natural language understanding, natural language generation, machine translation, dialogue system, question and answer, and speech recognition/synthesis.

In order to provide high-quality speech recognition services to the customers, it may be necessary to implement a technology that accurately identifies user intents from user speeches and a technology that provides appropriate content services corresponding to the identified user intents.

SUMMARY

According to an aspect of the disclosure, an electronic device includes: a communication interface; memory comprising an utterance cache; and at least one processor operatively connected to the communication interface and the memory, wherein the at least one processor is configured to: identify whether an input utterance corresponds to one or more cached utterances stored in the utterance cache; based on identifying that the input utterance corresponds to the one or more cached utterances, transmit the input utterance to an external electronic device through the communication interface; identify whether an operation corresponding to the input utterance is executable by the electronic device; based on identifying that the operation is executable by the electronic device, execute the operation; and based on identifying that the operation is not to be executable by the electronic device, transmit the input utterance to the external electronic device through the communication interface and add the input utterance to the utterance cache.

The at least one processor may be further configured to: obtain a speech utterance; convert the speech utterance into the input utterance in text form; and pre-process the converted input utterance.

The at least one processor may be further configured to, based on identifying that the input utterance corresponds to the one or more cached utterances, increase a hit count corresponding to the input utterance.

The at least one processor may be further configured to: obtain latency information corresponding to a time period taken to identify that the operation corresponding to the input utterance is not executable by the electronic device; and add the latency information about the input utterance to the utterance cache.

The at least one processor may be further configured to: identify the operation corresponding to the input utterance; and based on identifying that the operation corresponding to the input utterance is not executable by the electronic device and that the input utterance corresponds to a cached utterance, change the latency information about the input utterance.

The at least one processor may be further configured to: identify whether a size of the utterance cache reaches a maximum capacity; based on identifying that the size of the utterance cache reaches the maximum capacity, select one of the one or more cached utterances; and remove the selected one of the one or more cached utterances from the utterance cache.

The at least one processor may be further configured to select the one of the one or more cached utterances by selecting at least one utterance having a smallest hit count from among the one or more cached utterances.

The at least one processor may be further configured to: identify whether there are at least two utterances having the smallest hit count; and select an utterance having a lowest latency from among the at least two utterances having the smallest hit count.

The at least one processor may be further configured to identify whether the size of the utterance cache reaches a maximum capacity based on at least one of whether a number of the one or more cached utterances is less than a maximum number of entries or whether a cumulative string length for the one or more cached utterances is less than a maximum string length.

The utterance cache may further store at least one of hit count information corresponding to the one or more cached utterances and latency information corresponding to the one or more cached utterances.

According to an aspect of the disclosure, a method for analyzing a user utterance by an electronic device, includes: identifying whether an input utterance corresponds to one or more cached utterances; based on identifying that the input utterance corresponds to the one of the one or more cached utterances, transmitting the input utterance to an external electronic device through a communication interface of the electronic device; identifying whether an operation corresponding to the input utterance is executable by the electronic device; based on identifying that the operation is executable by the electronic device, executing the operation; and based on identifying that the operation is not executable by the electronic device, transmitting the input utterance to the external electronic device through the communication interface and adding the input utterance to an utterance cache.

The method may further include: obtaining a speech utterance; converting the speech utterance into the input utterance in text form; and pre-processing the converted input utterance.

The method may further include, based on identifying that the input utterance corresponds to the one or more cached utterances, increasing a hit count corresponding to the input utterance.

The method may further include: based on identifying that the operation corresponding to the input utterance is not executable by the electronic device, obtaining latency information corresponding to a time taken to identify that the operation corresponding to the input utterance is not executable; and adding the latency information about the input utterance to the utterance cache.

The method may further include: identifying an operation corresponding to the input utterance; and based on identifying that the operation corresponding to the input utterance is not executable by the electronic device and that the input utterance corresponds to a cached utterance, changing the latency information about the input utterance.

An embodiment of the disclosure is not limited to the foregoing objectives, and other objectives would readily be appreciated by a skilled artisan from the following detailed description taken in conjunction with the accompanying drawings.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
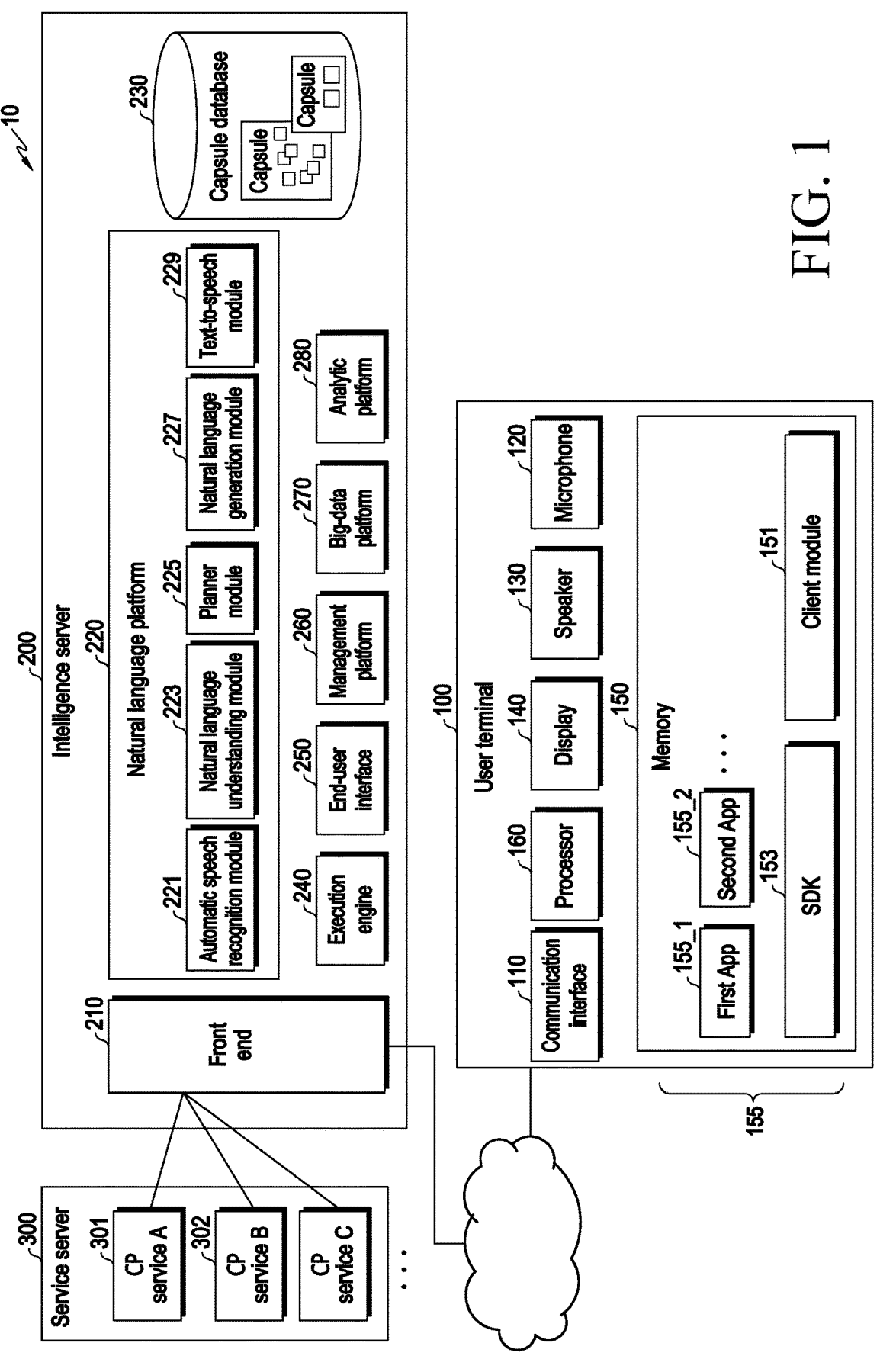
FIG. 1 is a block diagram illustrating an integrated intelligence system according to an embodiment of the disclosure.

Embodiments of the disclosure will be described below with reference to the accompanying drawings in such a detailed manner as to be easily practiced by one of ordinary skill in the art. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a block diagram illustrating an integrated intelligence system according to an embodiment.

Referring to FIG. 1, according to an embodiment, an integrated intelligence system 10 may include a user terminal 100, an intelligence server 200, and a service server 300.

According to an embodiment, the user terminal 100 may be a terminal device (or electronic device) that may connect to the Internet, e.g., a mobile phone, smartphone, personal digital assistant (PDA), laptop computer, TV, home appliance, wearable device, head-mounted device (HMD), or smart speaker.

According to the shown embodiment, the user terminal 100 may include a communication interface 110, a microphone 120, a speaker 130, a display 140, a memory 150, or a processor 160. The above-enumerated components may be operatively or electrically connected with each other.

According to an embodiment, the communication interface 110 may be configured to connect to, and transmit/receive data to/from, an external device. According to an embodiment, the microphone 120 may receive a sound (e.g., the user's utterance) and convert the sound into an electrical signal. According to an embodiment, the speaker 130 may output the electrical signal as a sound (e.g., speech). According to an embodiment, the display 140 may be configured to display images or videos. According to an embodiment, the display 140 may display a graphic user interface (GUI) of an app (or application program) that is executed.

According to an embodiment, the display 140 may be configured to display images or videos. According to an embodiment, the display 140 may display a graphic user interface (GUI) of an app (or application program) that is executed. The display 140 according to an embodiment may receive a touch input through a touch sensor. In one embodiment, the display 140 may receive a text input through a touch sensor of an on-screen keyboard area displayed on the display 140.

According to an embodiment, the memory 150 may store a client module 151, a software development kit (SDK) 153, and a plurality of apps 155. The client module 151 and the SDK 153 may configure a framework (or solution program)

for performing general-purpose functions. Further, the client module 151 or SDK 153 may configure a framework for processing user input (e.g., speech input, text input, touch input).

According to an embodiment, the plurality of apps 155 stored in the memory 150 may be programs for performing designated functions. According to an embodiment, the plurality of apps 155 may include a first app 155-1 and a second app 155-3. According to an embodiment, each of the plurality of apps 155 may include a plurality of actions for performing the designated function. For example, the apps may include an alarm app, a messaging app, and/or a scheduler app. According to an embodiment, the plurality of apps 155 may be executed by the processor 160 to sequentially execute at least some of the plurality of operations.

According to an embodiment, the processor 160 may control the overall operation of the user terminal 100. In one embodiment, the processor 160 may be electrically connected with the communication interface 110, microphone 120, speaker 130, and display 140 to perform designated operations.

According to an embodiment, the processor 160 may execute the program stored in the memory 150 to perform a designated function. In one embodiment, the processor 160 may execute at least one of the client module 151 or the SDK 153 to perform the following operations for processing user input. The processor 160 may control the operation of the plurality of apps 155 via, e.g., the SDK 153. The following operations described as operations of the client module 151 or SDK 153 may be operations according to the execution of the processor 160.

According to an embodiment, the client module 151 may receive a user input. In one embodiment, the client module 151 may receive a speech signal corresponding to the user's utterance detected via the microphone 120. Alternatively, the client module 151 may receive the touch input detected through the display 140. Alternatively, the client module 151 may receive the text input through the keyboard or the on-screen keyboard. Further, various types of user inputs detected through an input module included in the user terminal 100 or an input module connected to the user terminal 100 may be received. The client module 151 may transmit the received user input to the intelligence server 200. The client module 151 may transmit state information about the user terminal 100 along with the received user input to the intelligent server 200. The state information may be, e.g., app execution state information.

According to an embodiment, the client module 151 may receive a result corresponding to the received user input. In one embodiment, if the intelligent server 200 may produce the result corresponding to the received user input, the client module 151 may receive the result corresponding to the received user input. The client module 151 may display the received result on the display 140. Further, the client module 151 may output the received result as an audio through the speaker 130.

According to an embodiment, the client module 151 may receive a plan corresponding to the received user input. The client module 151 may display the results of execution of the plurality of operations of the app according to the plan on the display 140. The client module 151 may sequentially display execution results of a plurality of operations on the display and output audio through the speaker 130. As another example, the user terminal 100 may display only some results of execution of the plurality of operations (e.g., the result of the last operation) on the display and output audio through the speaker 130.

According to an embodiment, the client module 151 may receive a request for obtaining information necessary to produce the result corresponding to the user input from the intelligent server 200. According to an embodiment, the client module 151 may transmit the necessary information to the intelligent server 200 in response to the request.

According to an embodiment, the client module 151 may transmit information resultant from executing the plurality of operations according to the plan to the intelligence server 200. The intelligent server 200 may identify that the received user input has been properly processed using the result information.

According to an embodiment, the client module 151 may include a speech recognition module. According to an embodiment, the client module 151 may recognize the speech input to perform a limited function via the speech recognition module. In one embodiment, the client module 151 may perform an intelligence app to process the speech input to perform organic operations via a designated input (e.g., Wake up!).

According to an embodiment, the intelligent server 200 may receive information related to the user speech input from the user terminal 100 via a communication network. According to an embodiment, the intelligent server 200 may convert the data related to the received speech input into text data. According to an embodiment, the intelligent server 200 may generate a plan for performing the task corresponding to the user speech input based on the text data.

According to an embodiment, the plan may be generated by an artificial intelligence (AI) system. The AI system may be a rule-based system or a neural network-based system (e.g., feedforward neural network (FNN)) or recurrent neutral network (RNN)). Or, the artificial intelligent system may be a combination thereof or a system different therefrom. According to an embodiment, the plan may be selected from a set of pre-defined plans or created in real-time in response to a user request. In one embodiment, the artificial intelligent system may select at least one plan from among a plurality of pre-defined plans.

According to an embodiment, the intelligent server 200 may transmit the result according to the generated plan to the user terminal 100 or transmit the generated plan to the user terminal 100. According to an embodiment, the user terminal 100 may display the result according to the plan on the display. According to an embodiment, the user terminal 100 may display the result of execution of the operation according to the plan on the display.

According to an embodiment, the intelligence server 200 may include a front end 210, a natural language platform 220, a capsule database (DB) 230, an execution engine 240, an end user interface 250, a management platform 260, a big-data platform 270, or an analytic platform 280.

According to an embodiment, the front end 210 may receive the user input from the user terminal 100. The front end 210 may receive a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

According to an embodiment, the ASR module 221 may convert the user input received from the user terminal 100 into text data. According to an embodiment, the NLU module 223 may grasp the user's intent using the text data of the speech input. In one embodiment, the natural language understanding module 223 may perform syntactic analysis or semantic analysis on a text data type of user input to grasp the user's intent. According to an embodiment, the NLU module 223 may grasp the meaning of a word extracted from the user input using linguistic features (e.g., syntactic elements) of morphemes or phrases, match the grasped meaning of the word to the intent, and determine the user's intent. The natural language understanding module 223 may obtain intent information corresponding to user utterance. The intent information may be information representing the user's intent determined by interpreting the text data. The intent information may include information indicating an operation or function that the user wants to execute by the device.

According to an embodiment, the planner module 225 may generate a plan using the parameter and intent determined by the NLU module 223. According to an embodiment, the planner module 225 may determine a plurality of domains necessary to perform a task based on the determined intent. The planner module 225 may determine the plurality of operations included in the plurality of domains determined based on the intent. According to an embodiment, the planner module 225 may determine parameters necessary to execute the plurality of determined operations or resultant values output by execution of the plurality of operations. The parameters and resultant values may be defined in a designated format (or class) of concept. Thus, the plan may include the plurality of actions determined by the user's intent and a plurality of concepts. The planner module 225 may stepwise (or hierarchically) determine the relationship between the plurality of actions and the plurality of concepts. In one embodiment, the planner module 225 may determine the order of execution of the plurality of actions determined based on the user's intent based on the plurality of concepts. In other words, the planner module 225 may determine the order of execution of the plurality of actions based on the result output by execution of the plurality of actions and the parameters necessary to execute the plurality of actions. Thus, the planner module 225 may generate a plan that contains association information (e.g., ontology) between the plurality of actions and the plurality of concepts. A plan may be generated using information stored in the capsule DB 230 that stores a set of concept-operation relationships.

According to an embodiment, the NLG module 227 may convert designated information into a text type. The text-type information may be in the form of a natural language utterance. According to an embodiment, the TTS module 229 may convert text-type information into speech-type information.

According to an embodiment, all or some of the functions of the natural language platform 220 may also be implemented in the user terminal 100.

The capsule DB 230 may store information about the relationship between the plurality of concepts and actions corresponding to the plurality of domains. According to an embodiment, the capsule may include a plurality of concept objects (or concept information) and a plurality of action objects (or action information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry storing strategy information necessary to determine the plan corresponding to the speech input. The strategy information may include reference information for determining one plan if there are a plurality of plans corresponding to the user input. According to an embodiment, the capsule DB 230 may include a follow up registry storing follow up information to propose a subsequent action to the user in a designated context. The subsequent action may include, e.g., a subsequent utterance. According to an embodiment, the capsule DB 230 may include a layout registry storing layout information about the information output via the user terminal 100. According to an embodiment, the capsule database 230 may include a vocabulary registry storing vocabulary information included in capsule information. According to an embodiment, the capsule DB 230 may include a dialog registry storing dialog (or interaction) information with the user. The capsule DB 230 may update the stored object via a developer tool. The developer tool may include a function editor for updating, e.g., the action object or concept object. The developer tool may include a vocabulary editor for updating the vocabulary. The developer tool may include a strategy editor to generate and register a strategy to determine a plan. The developer tool may include a dialog editor to generate a dialog with the user. The developer tool may include a follow up editor capable of activating a subsequent goal and editing a subsequent utterance to provide a hint. The subsequent goal may be determined based on the current goal, the user's preference, or environmental conditions. According to an embodiment, the capsule DB 230 may also be implemented in the user terminal 100.

According to an embodiment, the execution engine 240 may produce a result using the generated plan. The end user interface 250 may transmit the produced result to the user terminal 100. Thus, the user terminal 100 may receive the result and provide the received result to the user. According to an embodiment, the management platform 260 may manage information used in the intelligent server 200. According to an embodiment, the big-data platform 270 may gather user data. According to an embodiment, the analytic platform 280 may manage the quality of service (QoS) of the intelligent server 200. In one embodiment, the analytic platform 280 may manage the components and processing speed (or efficiency) of the intelligent server 200.

The service server 300 of an embodiment may provide a designated service to the user terminal 100. In an embodiment, the service assigned to the user terminal 100 may include CP service A 301, CP service B 302, or CP service C. In one embodiment, CP service A 301 may be a food ordering service. CP service B 302 may be a hotel reservation service. CP service A 301 or CP service B 302 is not limited to the above-described example. According to an embodiment, the service server 300 may be a server operated by a third party. According to an embodiment, the service server 300 may provide information for generating the plan corresponding to the received user input to the intelligent server 200. The provided information may be stored in the capsule DB 230. The service server 300 may provide result information according to the plan to the intelligent server 200.

In the above-described integrated intelligence system 10, the user terminal 100 may provide various intelligent services to the user in response to user inputs. The user inputs may include, e.g., inputs using physical buttons, touch inputs, or speech inputs.

According to an embodiment, the user terminal 100 may provide a speech recognition service via an intelligence app (or speech recognition app) stored therein. In this case, for example, the user terminal 100 may recognize the user utterance or speech input received via the microphone and provide the service corresponding to the recognized speech input to the user.

According to an embodiment, the user terminal 100 may perform a designated operation, alone or together with the intelligent server and/or service server, based on the received speech input. In one embodiment, the user terminal 100 may execute the app corresponding to the received speech input and perform a designated operation via the executed app.

According to an embodiment, when the user terminal 100, together with the intelligent server 200 and/or service server 300, provides the service, the user terminal 100 may detect a user utterance using the microphone 120 and generate a signal (or speech data) corresponding to the detected user utterance. The user terminal 100 may transmit the speech data to the intelligence server 200 via the communication interface 110.

According to an embodiment, in response to the speech input received from the user terminal 100, the intelligent server 200 may generate a plan for performing the task corresponding to the speech input or the result of the operation performed according to the plan. The plan may include a plurality of actions for performing the task corresponding to the user's speech input and a plurality of concepts related to the plurality of actions. The concept may be one defining parameters input upon execution of the plurality of actions or one defining the resultant value output by execution of the plurality of actions. The plan may include association information between the plurality of actions and the plurality of concepts.

According to an embodiment, the user terminal 100 may receive the response via the communication interface 110. The user terminal 100 may output the speech signal generated inside the user terminal 100 to the outside using the speaker 130 or may output the image generated inside the user terminal 100 to the outside using the display 140.

Figure 2:
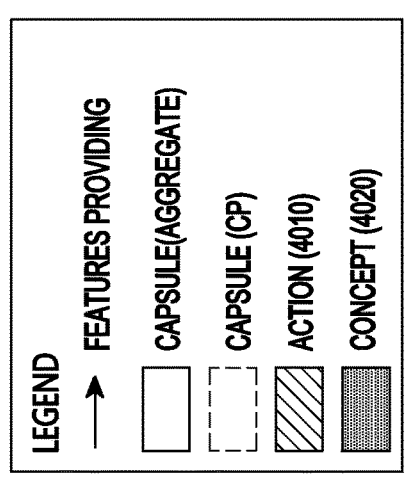
FIG. 2 is a view illustrating an example in which information for the relationship between a concept and an action is stored in a database according to an embodiment of the disclosure.
Figure 2:
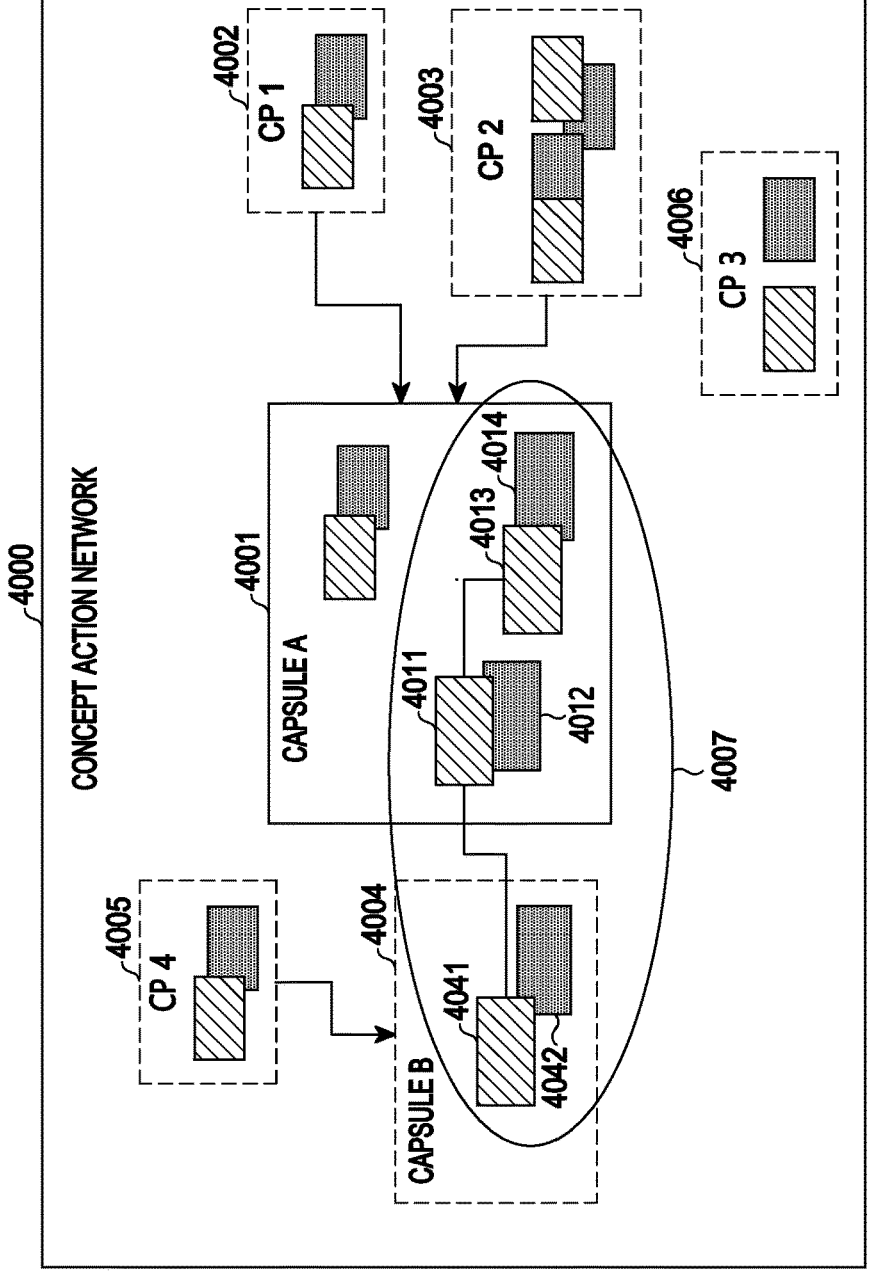

FIG. 2 illustrates an example in which information for the relationship between concept and action is stored in a database according to an embodiment.

A capsule database (e.g., the capsule database 230) of the intelligent server (e.g., the intelligent server 200 of FIG. 1) may store capsules in the form of a CAN 4000. The capsule database may store an operation for processing a task corresponding to the user's speech input and a parameter necessary for the operation in the form of the CAN 4000.

According to an embodiment, the capsule database may store a plurality of capsules (capsule A 4001 and capsule B 4004) respectively corresponding to a plurality of domains (e.g., applications). According to an embodiment, one capsule (e.g., capsule A 4001) may correspond to one domain (e.g., location (geo), application). Further, one capsule may correspond to at least one service provider (e.g., CP 1 4002, CP 2 4003, CP 3 4006, or CP 4 4005) for performing a function for a domain related to the capsule. According to an embodiment, one capsule may include at least one or more actions and at least one or more concepts for performing a designated function.

The natural language platform (e.g., the natural language platform 220 of FIG. 1) may generate a plan for performing a task corresponding to the received speech input using a capsule stored in the capsule database. In one embodiment, the planner module (e.g., the planner module 225 of FIG. 1) of the natural language platform may generate a plan using a capsule stored in the capsule database. In one embodiment, a plan 4007 may be generated using actions 4011 and 4013 and concepts 4012 and 4014 of capsule A 4001 and an action 4041 and concept 4042 of capsule B 4004.

Figure 3:
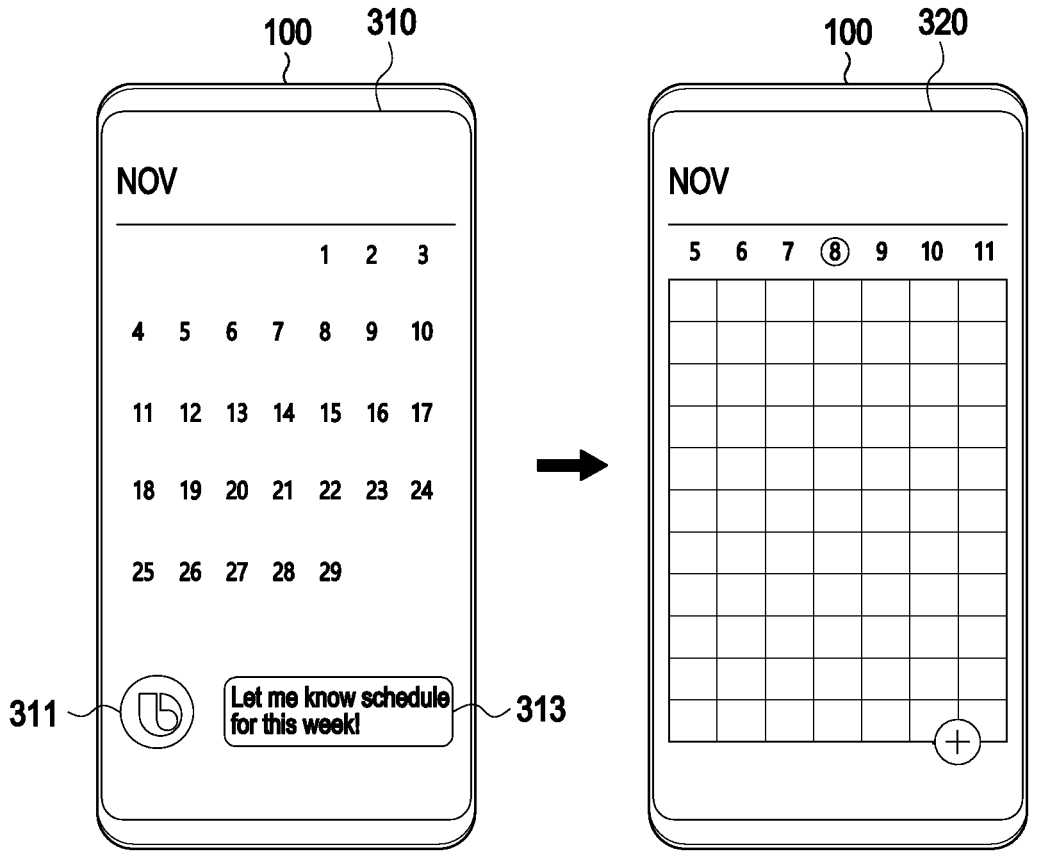
FIG. 3 is a view illustrating a user terminal displaying a screen for processing a speech input received through an intelligent app according to an embodiment of the disclosure.

FIG. 3 illustrates a screen in which a UE processes a speech input received through an intelligent app according to various embodiments.

The user terminal 100 may execute an intelligent app to process user inputs through the intelligent server (e.g., the intelligent server 200 of FIG. 1).

According to an embodiment, upon recognizing a designated speech input (e.g., a wakeup) or receiving an input through a hardware key (e.g., a dedicated hardware key) on a screen 310, the user terminal 100 may execute the intelligent app to process the speech input. The user terminal 100 may, e.g., execute an intelligent app in a state in which a schedule app is executed. According to an embodiment, the user terminal 100 may display an object (e.g., icon) 311 corresponding to the intelligent app on a display (e.g., the display 140 of FIG. 1). According to an embodiment, the user terminal 100 may receive a speech input by a user utterance. For example, the user terminal 100 may receive a speech input saying, "Tell me this week's schedule!". According to an embodiment, the user terminal 100 may display a user interface (UI) 313 (e.g., input window) of the intelligent app displaying the text data of the received speech input on the display.

According to an embodiment, on a screen 320, the user terminal 100 may display a result corresponding to the received speech input on the display 140. For example, the user terminal 100 may receive the plan corresponding to the received user input, and display a 'this week's schedule' on the display 140 according to the plan.

Figure 4:
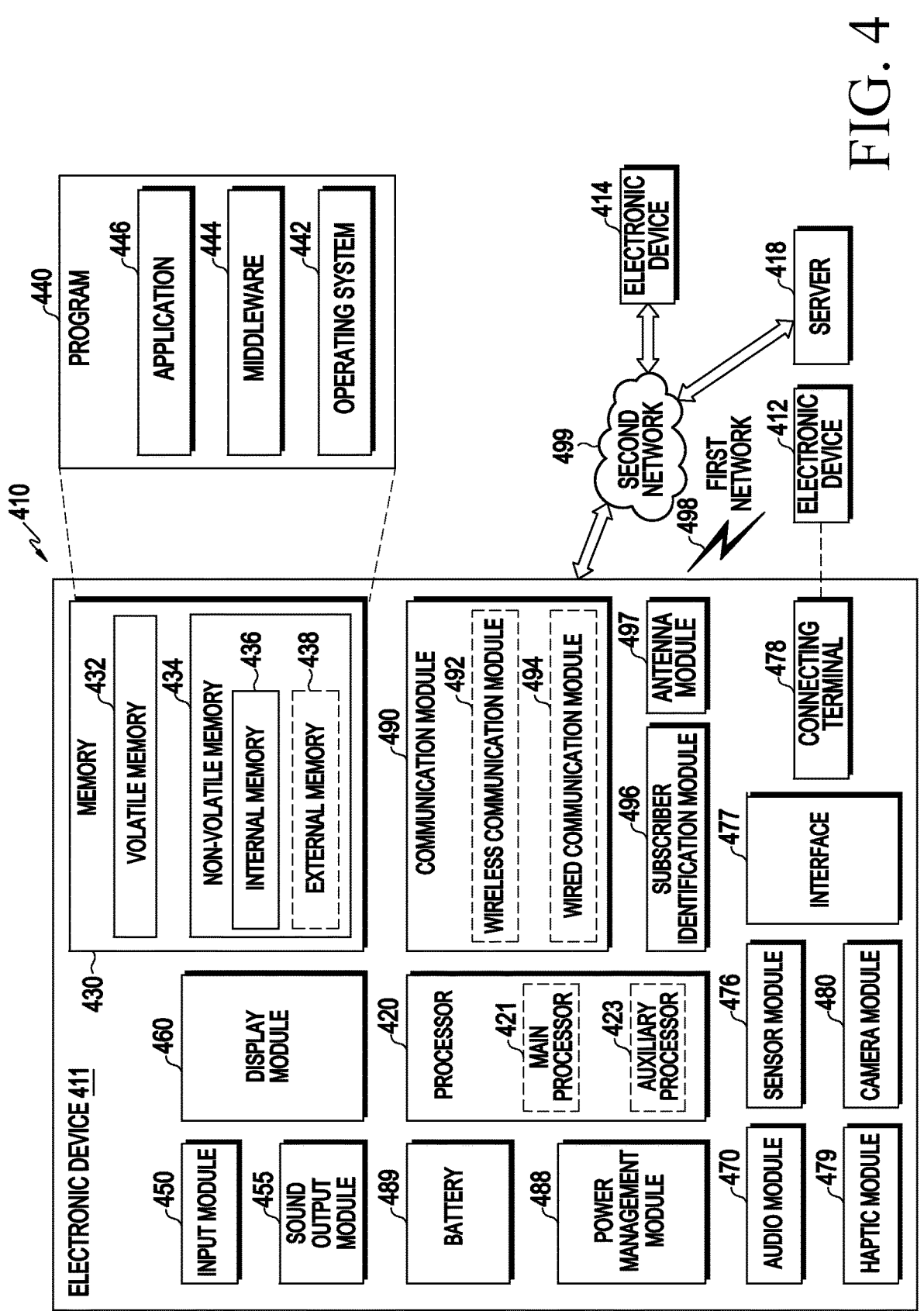
FIG. 4 is a block diagram illustrating an electronic device in a network environment according to an embodiment.

FIG. 4 is a block diagram illustrating an electronic device 411 in a network environment 410 according to an embodiment of the disclosure.

Referring to FIG. 4, an electronic device 411 (e.g., the user terminal 100 of FIGS. 1 to 3) in the network environment 410 may communicate with at least one of an electronic device 412 via a first network 498 (e.g., a short-range wireless communication network), or an electronic device 414 or a server 418 via a second network 499 (e.g., a long-range wireless communication network). According to an embodiment, the electronic device 411 may communicate with the electronic device 414 via the server 418. According to an embodiment, the electronic device 411 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 496, or an antenna module 497. In an embodiment, at least one (e.g., the connecting terminal 478) of the components may be omitted from the electronic device 411, or one or more other components may be added in the electronic device 101. According to an embodiment, some (e.g., the sensor module 476, the camera module 480, or the antenna module 497) of the components may be integrated into a single component (e.g., the display module 460).

The processor 420 may execute, for example, software (e.g., a program 440) to control at least one other component (e.g., a hardware or software component) of the electronic device 411 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 411 includes the main processor 421 and the auxiliary processor 423, the auxiliary processor 423 may be configured to use lower power than the main processor 421 or to be specified for a designated function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the electronic device 411, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 123. According to an embodiment, the auxiliary processor 423 (e.g., the neural processing unit) may include a hardware structure specified for artificial intelligence model processing. The artificial intelligence model may be generated via machine learning. Such learning may be performed, e.g., by the electronic device 411 where the artificial intelligence is performed or via a separate server (e.g., the server 418). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 411. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by other component (e.g., the processor 420) of the electronic device 411, from the outside (e.g., a user) of the electronic device 411. The input module 450 may include, for example, a microphone, a mouse, a keyboard, keys (e.g., buttons), or a digital pen (e.g., a stylus pen).

The sound output module 455 may output sound signals to the outside of the electronic device 411. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 411. The display 460 may include, for example, a display, a hologram device, or a projector and control circuitry to control a corresponding one of the display, hologram device, and projector. According to an embodiment, the display 460 may include a touch sensor configured to detect a touch, or a pressure sensor configured to measure the intensity of a force generated by the touch.

The audio module 470 may convert a sound into an electrical signal and vice versa. According to an embodiment, the audio module 470 may obtain the sound via the input module 450, or output the sound via the sound output module 455 or a headphone of an external electronic device (e.g., an electronic device 412) directly (e.g., wiredly) or wirelessly coupled with the electronic device 411.

The sensor module 476 may detect an operational state (e.g., power or temperature) of the electronic device 411 or an environmental state (e.g., a state of a user) external to the electronic device 101, and then generate an electrical signal or data value corresponding to the detected state. According to an embodiment, the sensor module 476 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 411 to be coupled with the external electronic device (e.g., the electronic device 412) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 411 may be physically connected with the external electronic device (e.g., the electronic device 412). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or motion) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 411. According to one embodiment, the power management module 488 may be implemented as at least part of, for example, a power management integrated circuit (PMIC).

The battery 489 may supply power to at least one component of the electronic device 411. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 411 and the external electronic device (e.g., the electronic device 412, the electronic device 414, or the server 418) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 414 via a first network 498 (e.g., a short-range communication network, such as Bluetooth™, wireless-fidelity (Wi-Fi) direct, or infrared data association (IrDA)) or a second network 499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 492 may identify or authenticate the electronic device 411 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 411, an external electronic device (e.g., the electronic device 414), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device). According to an embodiment, the antenna module 497 may include one antenna including a radiator formed of a conductor or conductive pattern formed on a substrate (e.g., a printed circuit board (PCB)). According to an embodiment, the antenna module 497 may include a plurality of antennas (e.g., an antenna array). In this case, at least one antenna appropriate for a communication scheme used in a communication network, such as the first network 498 or the second network 499, may be selected from the plurality of antennas by, e.g., the communication module 490. The signal or the power may then be transmitted or received between the communication module 490 and the external electronic device via the selected at least one antenna. According to an embodiment, other parts (e.g., radio frequency integrated circuit (RFIC)) than the radiator may be further formed as part of the antenna module 497.

According to an embodiment, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 411 and the external electronic device 414 via the server 418 coupled with the second network 499. The external electronic devices 412 or 414 each may be a device of the same or a different type from the electronic device 414. According to an embodiment, all or some of operations to be executed at the electronic device 411 may be executed at one or more of the external electronic devices 412, 414, or 418. For example, if the electronic device 411 should perform a function or a service automatically, or in response to a request from a user or another device, the electronic device 411, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 411. The electronic device 411 may provide the outcome, with or without further processing of the outcome, as at least part of a reply to the request. To that end, a cloud computing, distributed computing, mobile edge computing (MEC), or client-server computing technology may be used, for example. The electronic device 411 may provide ultra low-latency services using, e.g., distributed computing or mobile edge computing. In another embodiment, the external electronic device 414 may include an Internet-of-things (IoT) device. The server 418 may be an intelligent server using machine learning and/or a neural network. According to an embodiment, the external electronic device 414 or the server 418 may be included in the second network 499. The electronic device 411 may be applied to intelligent services (e.g., smart home, smart city, smart car, or healthcare) based on 5G communication technology or IoT-related technology.

Figure 5:
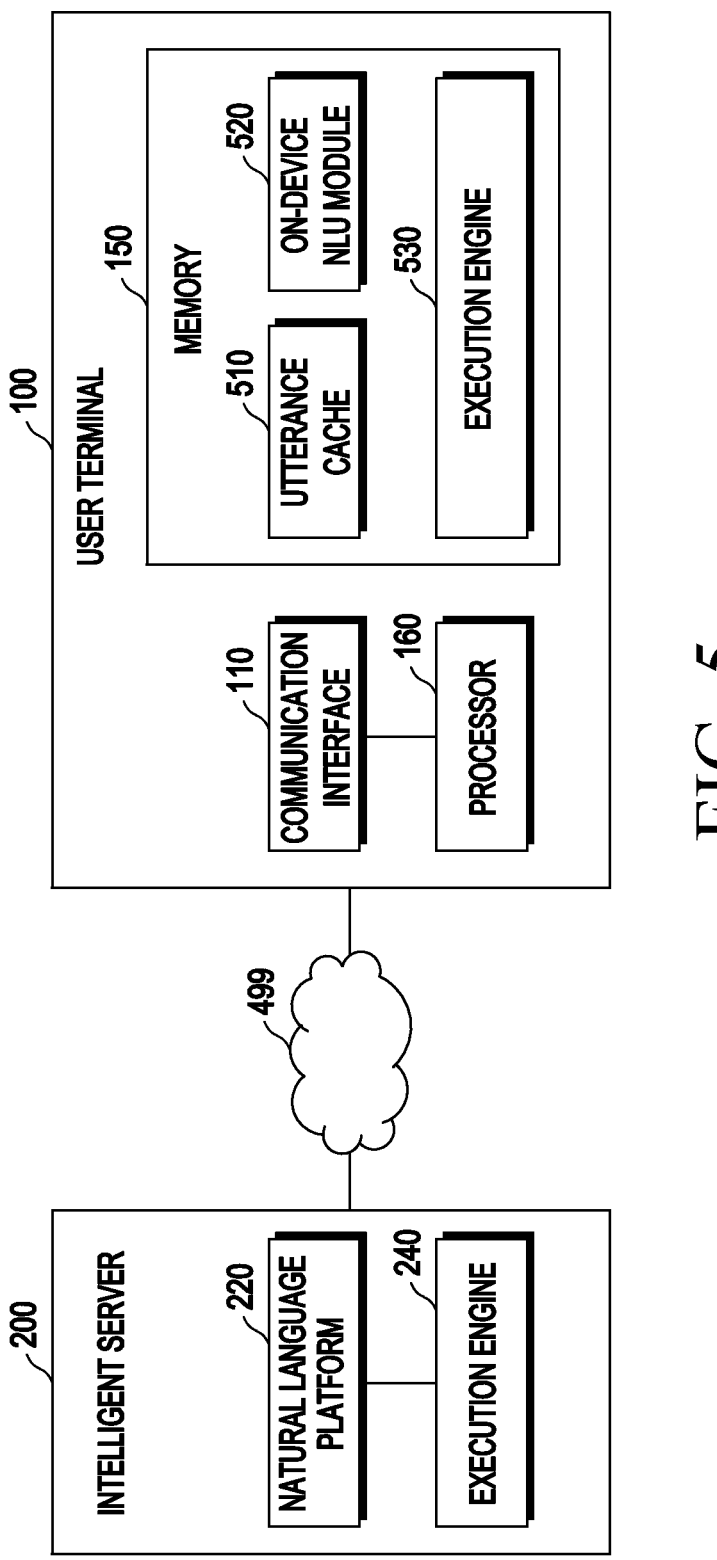
FIG. 5 is a view illustrating an example configuration of an electronic device in a network environment according to an embodiment of the disclosure.

FIG. 5 illustrates an example configuration of an electronic device (e.g., the user terminal 100) in a network environment according to an embodiment of the disclosure.

In FIG. 5, in an embodiment, the user terminal 100 (corresponding to the user terminal 100 of FIGS. 1 to 3 or the electronic device 411 of FIG. 4) may include a communication interface 110, a memory 150, and at least one processor 160 operatively connected to the communication interface 110 and the memory 150. In an embodiment, the user terminal 100 may be referred to as an "electronic device 100".

In an embodiment, the communication interface 110 may correspond to the communication interface 110 of FIG. 1 or the communication module 490 of FIG. 4. In an embodiment, the communication interface 110 may communicate with an external electronic device (e.g., the intelligent server 200) through a second network 499 (e.g., the second network 499 of FIG. 4), In an embodiment, the electronic device 100 (e.g., the communication interface 110) may transmit data to the intelligent server 200 (e.g., the intelligent server 200 of FIG. 1).

In one embodiment, the electronic device 100 may transmit the user utterance to the intelligent server 200 through the second network 499 based on identifying that the command corresponding to the user utterance may not be executed by the electronic device 100. The electronic device 100 may obtain (or receive) the analyzed utterance and/or calculated result by the intelligent server 200 (e.g., the natural language platform 220 or the execution engine 240) through the second network 499 from the intelligent server 200.

In an embodiment, the memory 150 may correspond to the memory 150 of FIG. 1 or the memory 430 of FIG. 4. In an embodiment, the memory 340 may store an utterance cache 510 for storing cached utterances, an on-device NLU module 520 for identifying a command corresponding to a user utterance, and an execution engine 530 for executing an operation corresponding to the user utterance. Information stored in the memory 150 is described below.

In an embodiment, the electronic device (e.g., the processor 160) may perform a function of the natural language platform 220 included in the intelligent server 200 by executing the on-device NLU module 520. In one embodiment, the natural language platform 220 may include an ASR module (e.g., the ASR module 221 of FIG. 1), the NLU module 223 of FIG. 1, the planner module 225 of FIG. 1, the NLG module 227 of FIG. 1, or the TTS module 229 of FIG. 1, and the electronic device 100 may perform a function of the natural language platform 220 performed by the intelligent server 200.

In an embodiment, modules (e.g., the utterance cache 510, the on-device NLU module 520, and the execution engine 530) implemented (or stored) in the electronic device 100 may be implemented in the form of an application, a program, computer code, instructions, routines, processes, software, firmware, or a combination of at least two thereof, executable by the processor 160. In one embodiment, when the modules (e.g., the utterance cache 510, the on-device NLU module 520, and the execution engine 530) are executed, the processor 160 may perform corresponding operations. Therefore, when it is described below that a specific module performs an operation, it may be understood as the processor 160 performing the operation corresponding to the specific module as the specific module is executed. In an embodiment, at least some of the modules (e.g., the utterance cache 510, the on-device NLU module 520, and the execution engine 530) may include a plurality of programs, but are not limited thereto. At least some of the modules (e.g., the utterance cache 510, the on-device NLU module 520, and the execution engine 530) may be implemented in a hardware form (e.g., a processing circuit).

In an embodiment, at least one processor 160 may correspond to the processor 160 of FIG. 1 or the processor 420 of FIG. 4.

In an embodiment, the processor 160 may control an overall operation for storing the user utterance in the utterance cache 510. In an embodiment, the processor 160 may include one or more processors for processing a user utterance. An operation performed by the processor 160 to process a user utterance is described below with reference to FIGS. 6 to 12.

Although FIG. 5 illustrates an in which the electronic device 100 includes the communication interface 110, the memory 150, and/or the processor 160, the disclosure is not limited thereto. In one embodiment, the electronic device 100 may further include at least one component shown in FIG. 4. In one embodiment, the electronic device 100 may further include an input module (e.g., the input module 450 of FIG. 4) for directly obtaining a user utterance in a voice form from a user.

Figure 6:
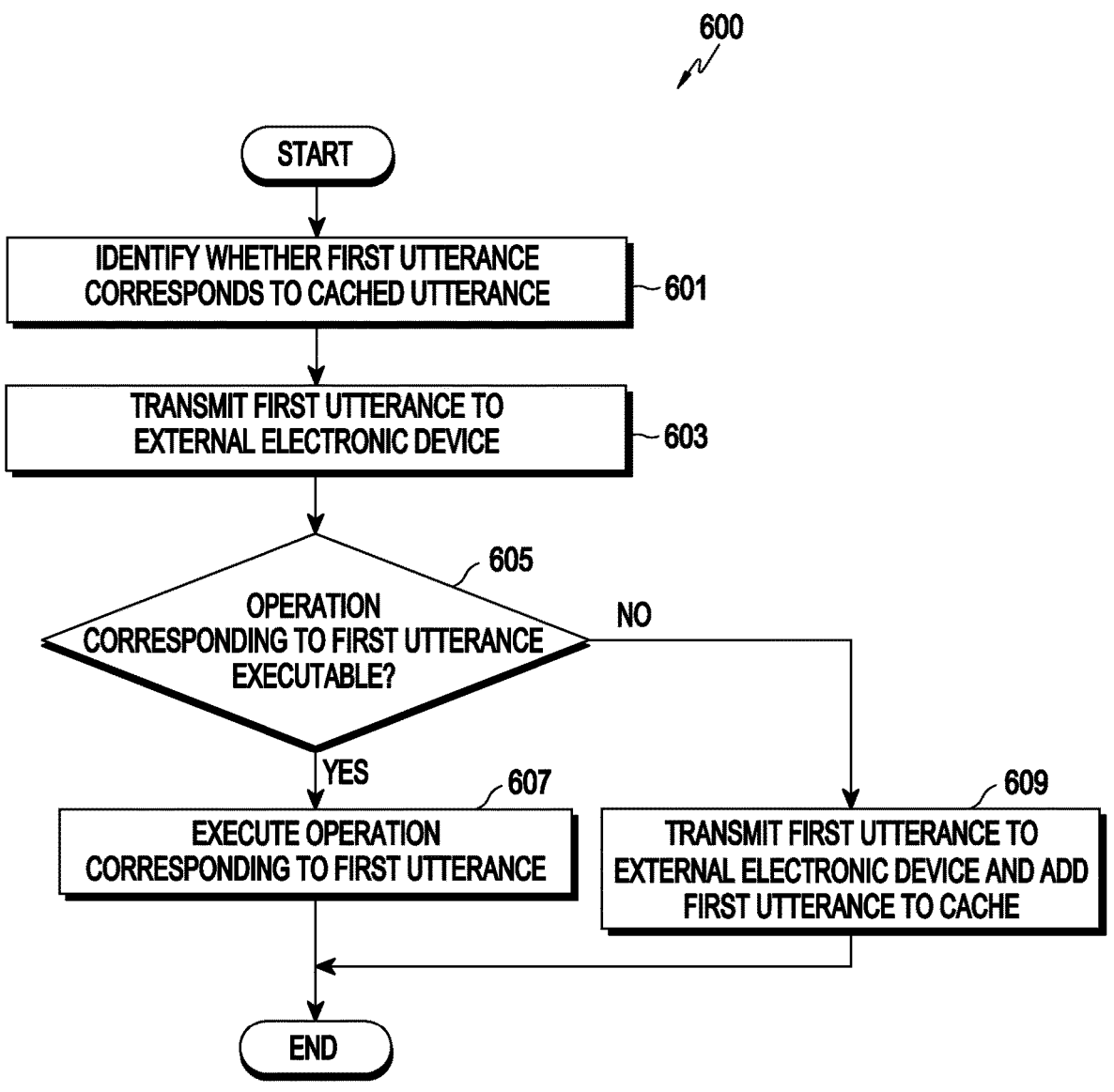
FIG. 6 is a flowchart illustrating an operations for analyzing a user utterance by an electronic device according to an embodiment of the disclosure.

FIG. 6 is a flowchart 600 illustrating operations for analyzing a user utterance by an electronic device (e.g., the user terminal 100 of FIG. 1) according to an embodiment.

In an embodiment, the operations shown in FIG. 6 are not limited to the shown order but may rather be performed in other various orders. In one embodiment, the order of the operations may be changed, and at least two operations may be performed in parallel. According to an embodiment, more or less operations than those of FIG. 6 may be performed.

In FIG. 6, in operation 601, in an embodiment, the electronic device 100 (e.g., the processor 160 of FIG. 1) may identify whether an input utterance corresponds to a cached utterance.

In an embodiment, the electronic device 100 may previously store one or more cached utterances in an utterance cache (e.g., the utterance cache 510 of FIG. 5). In an embodiment, the one or more cached utterances may be processed by an external electronic device (e.g., the intelligence server 200 of FIG. 5). The electronic device 100 may identify whether the input utterance corresponds to one or more cached utterances. In an embodiment, the input utterance may be text data. In an embodiment, the electronic device 100 may determine whether the input utterance is an utterance to be transmitted to the intelligent server 200 or an utterance that can be processed by the on-device NLU module 520, based on the utterance cache 510.

In an embodiment, the electronic device 100 may identify whether the input utterance corresponds to one or more cached utterances, based on an exact matching. The electronic device 100 may identify whether the input utterance corresponds to one or more cached utterances, based on the Levenshtein distance. The electronic device 100 may identify whether the input utterance corresponds to one or more cached utterances, for example, based on the cosine distance. The method in which the electronic device 100 matches the input utterance with the cached utterance is not limited to the above-described example. In the embodiment, the memory size or computational complexity used by the electronic device 100 to match the input utterance with the cached utterance may be smaller than the memory size or computational complexity used to execute the on-device NLU module (e.g., the on-device NLU module 520 of FIG.

5). In an embodiment, the operation in which the electronic device 100 matches the input utterance to the cached utterance may be referred to as a "first determination algorithm".

In operation 603, in an embodiment, the electronic device 100 may transmit the input utterance to an external electronic device (e.g., the intelligence server 200 of FIG. 1), based on identifying that the input utterance corresponds to the cached utterance.

In an embodiment, the electronic device 100 may transmit the input utterance to the intelligent server 200 through a communication interface (e.g., the communication interface 110 of FIG. 1), based on identifying that the input utterance corresponds to any one of the cached one or more utterances. In an embodiment, the electronic device 100 may transmit the input utterance matched with the utterance cache 510 to the intelligent server 200 before executing the on-device NLU module 520, thereby relatively reducing the time taken for utterance processing.

In operation 605, in an embodiment, the electronic device 100 may identify whether an operation corresponding to the input utterance is executable.

In an embodiment, the electronic device 100 may obtain a first command corresponding to the input utterance by executing the on-device NLU module 520. In an embodiment, the electronic device 100 may identify whether the electronic device 100 is capable of executing an operation corresponding to the input utterance.

According to an embodiment, the electronic device 100 may identify the operation corresponding to the input utterance by executing the on-device NLU module 520, based on identifying that the input utterance does not correspond to the cached utterance. In an embodiment, the electronic device 100 may identify the operation corresponding to the input utterance by executing the on-device NLU module 520 in parallel with the operation of identifying whether the input utterance corresponds to the cached utterance based on the utterance cache 510, and may identify whether the identified operation is executable by the electronic device 100. In an embodiment, the operation of determining the operation corresponding to the input utterance through the on-device NLU module or determining whether the operation corresponding to the input utterance is executable by the electronic device 100 may be referred to as a "second determination algorithm". In an embodiment, the second determination algorithm may use a larger memory than the 'first determination algorithm' or may require a larger amount of calculation.

In operation 607, in an embodiment, the electronic device 100 may execute the operation corresponding to the input utterance, based on identifying that the operation corresponding to the input utterance may be executed ("YES" in operation 605).

In an embodiment, based on identifying that the electronic device 100 is capable of executing the operation corresponding to the input utterance, the electronic device 100 may directly execute the operation corresponding to the input utterance without receiving information about the operation executed in response to the input utterance from the intelligent server 200.

In operation 609, in an embodiment, the electronic device 100 may transmit the first command to the external electronic device 200, may add the input utterance to the utterance cache 510, or may update the utterance cache information, based on identifying that the operation corresponding to the input utterance may not be executed ("NO" in operation 605).

In an embodiment, based on identifying that the operation corresponding to the input utterance may not be executed by the electronic device 100, the electronic device 100 may transmit the input utterance to the intelligent server 200 through the communication interface 110, may add the input utterance to the utterance cache 510, or may update the utterance cache information. In an embodiment, when the electronic device 101 performs the operation of identifying whether the input utterance corresponds to the cached utterance based on the utterance cache 510 and the operation of identifying whether the operation corresponding to the input utterance is executable based on the on-device NLU module 520 in parallel, only latency information about the input utterance may be added to the utterance cache 510. Table 1 is a look-up table showing information included in the utterance cache 510. In an embodiment, the user utterance and the hit count and a latency corresponding to the user utterance may be stored in metadata.

TABLE 1

| User utterance | Hit count | Latency |
|---|---|---|
| Tell me the weather today | 100 | 110 |
| . | . | . |
| . | . | . |
| . | . | . |

In an embodiment, the utterance cache 510 may include one or more cached utterances, a hit count corresponding to each of the cached utterances, and latency information corresponding to each of the one or more cached utterances. For example, when the cached utterance is "Tell me the weather today", the electronic device 100 may increase the hit count by 1 whenever the input utterance matches the cached utterance. In Table 1, the number of times the cached utterance is matched may be 100, and the time taken to process the cached utterance may be 110 milliseconds (ms). The text or numerical value described in Table 1 is an example for describing the utterance cache 510, and is not limited thereto. In an embodiment, the electronic device 100 may add latency information obtained based on executing the on-device NLU module 520 to the utterance cache 510. In an embodiment, the electronic device 100 may update the latency whenever obtaining the latency for the cached utterance. In one embodiment, the electronic device 100 may obtain (or calculate) a representative value (e.g., an intermediate value, a minimum value, or an average value) of the latency based on the added latency information. The electronic device 100 may update the latency whenever the latency for the cached utterance is obtained, thereby enhancing the reliability of the latency for the cached utterance.

In an embodiment, the utterance cache 510 may store cached utterances less than a preset maximum number of entries. In an embodiment, the maximum number of entries may be a maximum value of input utterances that may be stored in the utterance cache. For example, when the maximum number of entries is 99, the electronic device 100 may determine that the utterance cache exceeds the maximum number of entries, based on identifying that 100 cached utterances are stored in the utterance cache. In an embodiment, the utterance cache 510 may maintain the number of cached utterances to be less than the maximum number of entries, thereby enhancing the operation efficiency of the utterance cache 510.

In an embodiment, the electronic device 100 may maintain the number of cached utterances of the utterance cache 510 to be less than the maximum number of entries, thereby relatively reducing the operation time taken to identify whether the input utterance corresponds to any one of the cached utterances. In an embodiment, the electronic device 100 may previously store the maximum number of entries in the metadata. In an embodiment, the electronic device 100 may previously store a maximum string length for utterances cached in metadata. In an embodiment of the disclosure, the maximum string length may be a maximum value of cumulative string lengths of cached utterances in the form of a string. For example, when the maximum string length is 99, the electronic device 100 may determine that the utterance cache exceeds the maximum string length, based on identifying that 100 cached utterances having the string length of 10 are stored in the utterance cache.

In an embodiment, the user utterance cached in the utterance cache 510 and the hit count and latency information corresponding to the user utterance may be loaded into a memory (e.g., the memory 150 of FIG. 5) in an initialization operation of the electronic device 100. In an embodiment of the disclosure, the user utterance, the hit count and latency information corresponding to the user utterance, the maximum number of entries, and the maximum string length may be stored in metadata when the electronic device 100 of FIG. 6 terminates operations for analyzing the user utterance. In an embodiment, the information stored in the metadata may be loaded into the memory 150 when the operation of analyzing the user utterance of the electronic device 100 of FIG. 6 is started.

In an embodiment of the disclosure, the information included in the metadata may further include information about an identifier (user ID) for identifying a user, a token value, an identifier (device ID) for identifying the electronic device 100, and a device type. In an embodiment, the electronic device 100 may select various operating methods of the utterance cache 510 according to the device type, based on metadata. For example, the maximum number of entries and/or the maximum string length may be set to be different depending on which device the electronic device 100 corresponds among various devices such as a cellular terminal, a TV, or a refrigerator. In an embodiment, the maximum number of entries and/or the maximum string length may be updated based on communication with the intelligent server 200. An operation in which the electronic device 100 operates the utterance cache 510 is described below with reference to FIGS. 11 and 12.

Figure 7:
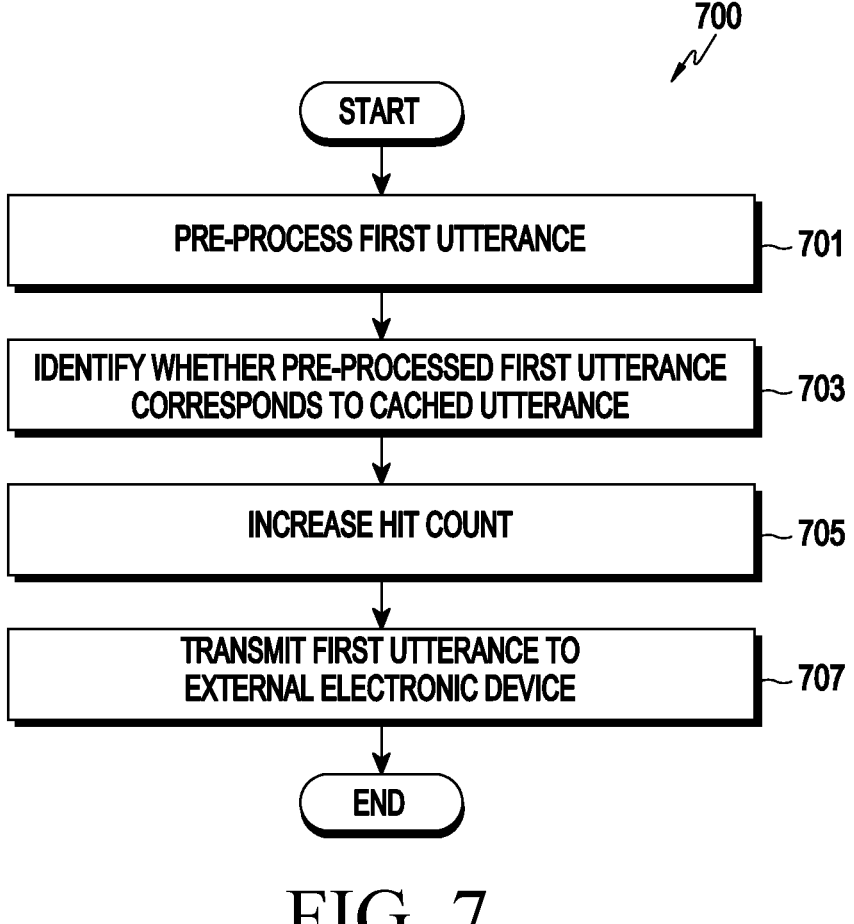
FIG. 7 is a flowchart illustrating an operation of processing a user utterance based on identifying that a user utterance corresponds to a cached utterance by an electronic device according to an embodiment of the disclosure.

FIG. 7 is a flowchart 700 illustrating operations for processing a user utterance based on identifying that a user utterance corresponds to a cached utterance by an electronic device (e.g., the user terminal 100 of FIG. 1) according to an embodiment of the disclosure.

In an embodiment, the operations shown in FIG. 7 are not limited to the shown order but may rather be performed in other various orders. In one embodiment, the order of the operations may be changed, and at least two operations may be performed in parallel. According to an embodiment, additional operations, other than those of FIG. 7, may be performed.

In FIG. 7, in operation 701, in an embodiment, the electronic device 100 (e.g., the processor 160 of FIG. 1) may preprocess an input utterance.

In an embodiment, the electronic device 100 may obtain a speech utterance. In one embodiment, the electronic device 100 may obtain a speech utterance from the user through a microphone (e.g., the microphone 120 of FIG. 1 or the input module 450 of FIG. 4). The electronic device 100 may obtain a speech utterance from an external electronic device (e.g., the server 418 of FIG. 4) through the second network

499. In an embodiment, the electronic device 100 may convert the speech utterance into the input utterance in a text form. In one embodiment, the electronic device 100 may convert a speech utterance into an input utterance in a text form, based on a natural language platform pre-stored in a memory (e.g., the memory 150 of FIG. 1) to perform a function of an intelligent server (e.g., the intelligent server 200 of FIG. 5). In an embodiment, the electronic device 100 may pre-process the converted input utterance. In the embodiment, the electronic device 100 may remove a blank space and/or a special character included in the input utterance in a text form.

In operation 703, in an embodiment, the electronic device 100 may identify whether the pre-processed input utterance corresponds to the cached utterance.

In an embodiment, the electronic device 100 may identify whether the utterance (refined based on the pre-processing) corresponds to the cached utterance by traversing the utterance cache 510. Since operation 703 is at least partially the same or similar to the operation 601, no detailed description thereof is presented below.

In operation 705, in an embodiment, the electronic device 100 may increase the hit count based on identifying that the input utterance corresponds to the cached utterance.

In an embodiment, the electronic device 100 may increase the hit count corresponding to the input utterance, based on identifying that the pre-processed input utterance corresponds to any one of the cached one or more utterances. The electronic device 100 may identify the utterance pattern of the user based on the numerical value of the hit count corresponding to the input utterance. In one embodiment, based on identifying the cached utterance corresponding to the hit count higher than the reference hit count, the electronic device 100 may identify that the utterance is frequently used by the user. Based on identifying the cached utterance corresponding to the hit count lower than the reference hit count, the electronic device 100 may identify that the utterance is rarely used by the user.

In operation 707, in an embodiment, the electronic device 100 may transmit the input utterance to an external electronic device (e.g., the intelligence server 200 of FIG. 1), based on identifying that the input utterance corresponds to the cached utterance.

In an embodiment, the electronic device 100 may transmit the input utterance corresponding to the cached utterance to the intelligence server 200, thereby reducing the delay caused by the electronic device 100 directly processing the user utterance to be processed by the intelligence server 200. Since operation 707 is at least partially the same or similar to the operation 603, no detailed description thereof is presented below.

Figure 8:
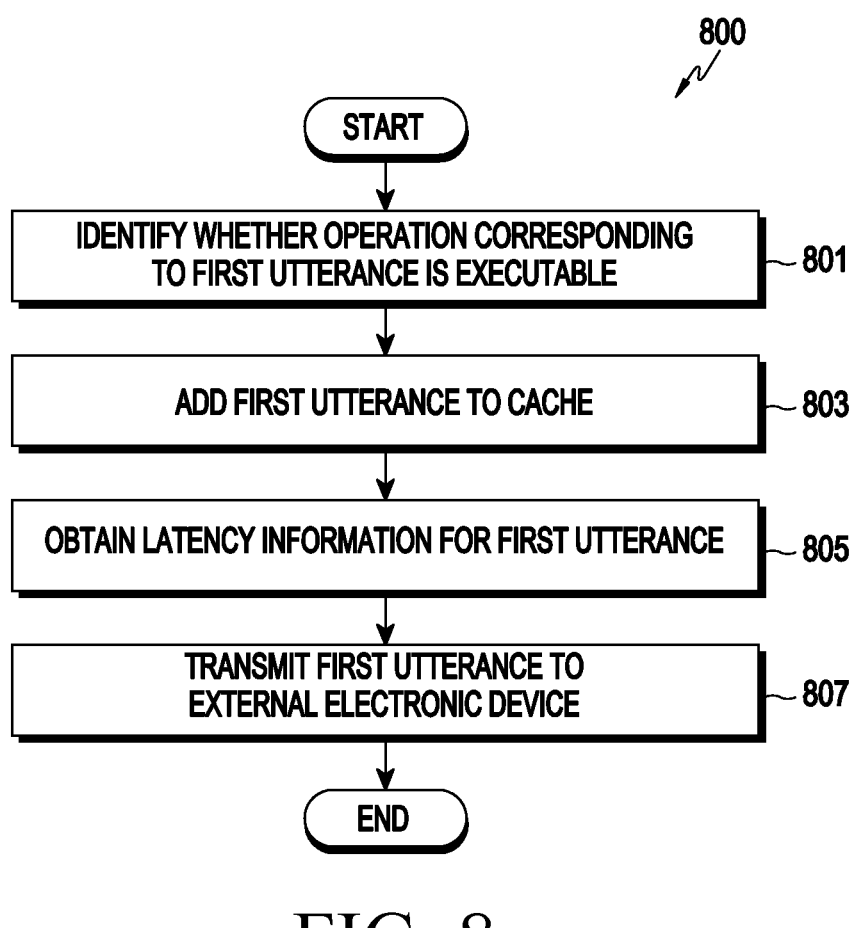
FIG. 8 is a flowchart illustrating an operation of processing a user utterance based on whether an electronic device may execute an operation corresponding to an input utterance according to an embodiment of the disclosure.

FIG. 8 is a flowchart 800 illustrating operations for processing a user utterance based on whether an electronic device (e.g., the user terminal 100 of FIG. 1) may execute an operation corresponding to an input utterance according to an embodiment of the disclosure.

In an embodiment, the operations shown in FIG. 8 are not limited to the shown order but may rather be performed in other various orders. In one embodiment, the order of the operations may be changed, and at least two operations may be performed in parallel. According to an embodiment, more or less operations than those of FIG. 8 may be performed.

In FIG. 8, in operation 801, in an embodiment, the electronic device 100 (e.g., the processor 160 of FIG. 1) may identify whether an operation corresponding to an input utterance is executable by the electronic device.

In an embodiment, the electronic device 100 may identify whether the operation corresponding to the input utterance is executable by the electronic device 100, based on identifying that the input utterance does not correspond to one or more utterances cached in the utterance cache 510. The electronic device 100 may identify whether the operation corresponding to the input utterance is executable by the electronic device 100 in parallel to the operation of identifying whether the input utterance corresponds to one or more utterances cached in the utterance cache 510. Since operation 801 is at least partially the same or similar to the operation 605, no detailed description thereof is presented below.

In operation 803, in an embodiment, the electronic device 100 may add the input utterance to the utterance cache (e.g., the utterance cache 510 of FIG. 5) or update the utterance cache information, based on identifying that the operation corresponding to the input utterance may not be executed.

In an embodiment, the electronic device 100 may store the input utterance in the utterance cache 510 and determine the hit count corresponding to the input utterance to be 1. In an embodiment, before adding the input utterance to the utterance cache 510, the electronic device 100 may identify whether the memory of the utterance cache 510 reaches the maximum capacity. The electronic device 100 may store the input utterance in the utterance cache 510 after removing any one of the cached one or more utterances, based on identifying that a size of the utterance cache 510 has reached the maximum capacity. An operation, performed by the electronic device 100, of identifying the capacity of the utterance cache 510 and removing any one of the one or more cached utterances is described in more detail with reference to FIGS. 11 and 12.

In operation 805, in an embodiment, the electronic device 100 may obtain latency information about the input utterance.

In an embodiment, the electronic device 100 may obtain latency information corresponding to the time taken to identify that the operation corresponding to the input utterance is not executable by the electronic device. In one embodiment, the electronic device 100 may identify that an operation corresponding to the input utterance is not executable by executing the on-device NLU module 520. The electronic device 100 may obtain a latency for the input utterance based on identifying that the operation corresponding to the input utterance is not executed by the electronic device 100. The electronic device 100 may add latency information about the input utterance to the utterance cache 510.

In operation 807, in an embodiment, the electronic device 100 may transmit the input utterance to an external electronic device (e.g., the intelligent server 200 of FIG. 1), based on identifying that the operation corresponding to the input utterance may not be executed.

In an embodiment, the electronic device 100 may obtain (or receive) information related to the operation determined based on the input utterance transmitted to the intelligent server 200 from the intelligent server 200 through the second network 499. The electronic device 100 may perform a response to the input utterance based on the information related to the operation determined by the intelligent server 200.

Figure 9:
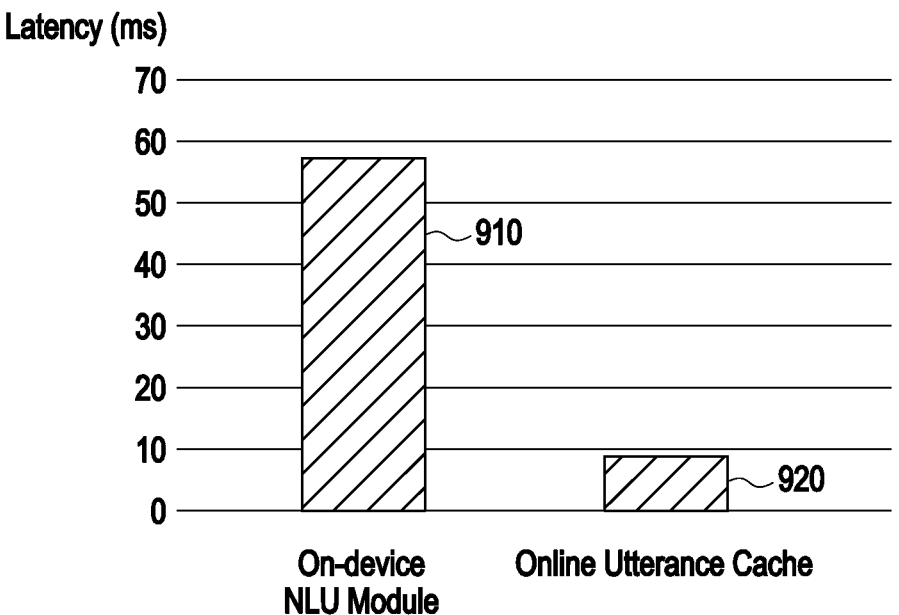
FIG. 9 is a view illustrating an example of latency generated based on processing a user utterance based on an utterance cache by an electronic device according to an embodiment of the disclosure.

FIG. 9 illustrates an example of a latency generated when an electronic device (e.g., the user terminal 100 of FIGS. 1 to 3) processes a user utterance based on an utterance cache (e.g., the utterance cache 510 of FIG. 5) according to an embodiment.

In FIG. 9, in an embodiment, when an on-device NLU module (e.g., the on-device NLU module 520 of FIG. 5) is executed for all user utterances, the electronic device 100 may generate a latency of about 50 ms to about 60 ms.

In an embodiment, when the electronic device 100 transmits a user utterance corresponding to the cached utterance to an external electronic device (e.g., the intelligent server 200 of FIG. 5) based on the utterance cache 510, the electronic device 100 may generate a latency of less than about 10 ms. Based on identifying the user utterance corresponding to the utterance already cached, the electronic device 100 may transmit the identified user utterance to the intelligence server 200 before identifying the execution result of the on-device NLU module, thereby reducing latency.

The value of the latency shown in FIG. 9 is an example for comparing the latency between the on-device NLU module 520 based on the 'second determination algorithm' and the utterance cache 510 based on the 'first determination algorithm,' and is not limited thereto.

Figure 10:
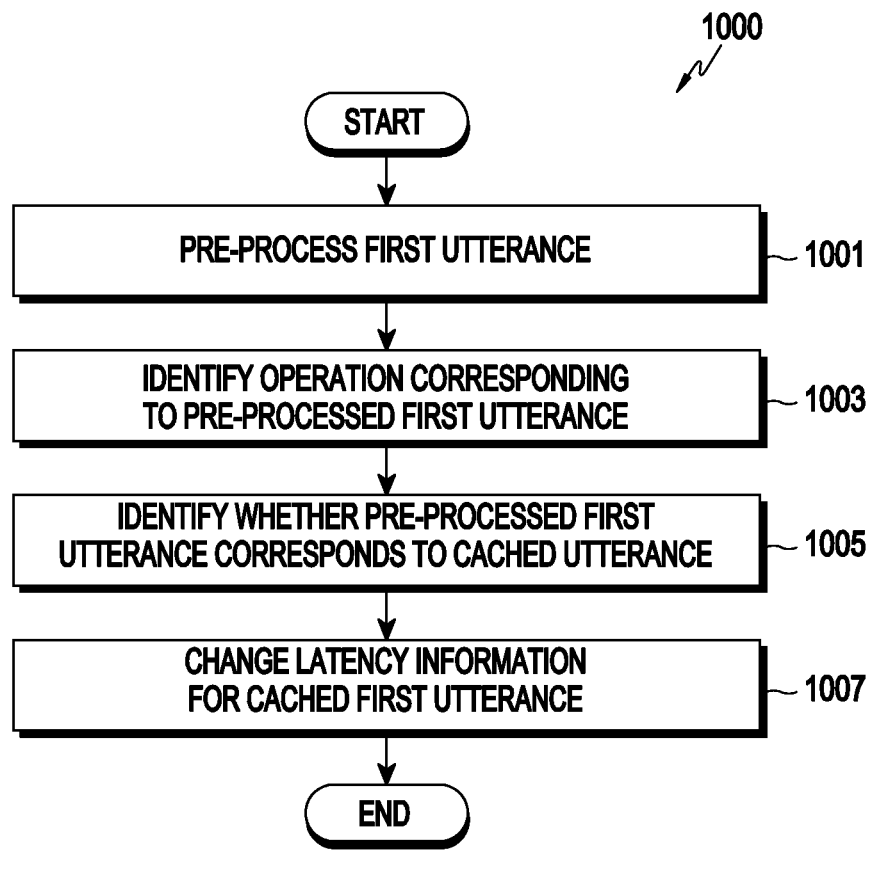
FIG. 10 is a flowchart illustrating an operation of changing latency information about a cached utterance by an electronic device according to an embodiment of the disclosure.

FIG. 10 is a flowchart 1000 illustrating an operation, performed by an electronic device (e.g., the user terminal 100 of FIG. 1), of changing latency information about a cached utterance, according to an embodiment of the disclosure.

In an embodiment, the operations shown in FIG. 10 are not limited to the shown order but may rather be performed in other various orders. In one embodiment, the order of the operations may be changed, and at least two operations may be performed in parallel. According to an embodiment, more or less operations than those of FIG. 10 may be performed.

In FIG. 10, in operation 1001, in an embodiment, the electronic device 100 (e.g., the processor 160 of FIG. 1) may preprocess an input utterance. Since operation 1001 is at least partially the same or similar to the operation 701, no detailed description thereof is presented below.

In operation 1003, in an embodiment, the electronic device 100 may identify an operation corresponding to the pre-processed input utterance. According to an embodiment, the electronic device 100 may identify an operation corresponding to the pre-processed input utterance by executing an on-device NLU module (e.g., the on-device NLU module 520 of FIG. 5).

In operation 1005, in an embodiment, the electronic device 100 may identify whether the pre-processed input utterance corresponds to the cached utterance.

In an embodiment, the electronic device 100 may identify whether the pre-processed input utterance corresponds to any one of the one or more cached utterances, based on an utterance cache (e.g., the utterance cache 510 of FIG. 5). In an embodiment, operation 1003 and operation 1005 may be performed in parallel. In an embodiment, before the execution of operation 1003 is completed, the electronic device 100 may identify whether the pre-processed input utterance corresponds to any one of the utterances cached in the utterance cache 510. In an embodiment, based on identifying that the pre-processed input utterance does not correspond to any one of the utterances cached in the utterance cache 510, the electronic device 100 may execute an operation corresponding to the input utterance, may transmit a first command to an external electronic device (e.g., the intelligence server 200 of FIG. 5) and may add the input utterance to the utterance cache 510, or may update the utterance cache information, according to the result of operation 1003.

In operation 1007, in an embodiment, the electronic device 100 may change latency information about the cached input utterance, based on identifying that the input utterance corresponds to the cached utterance.

In an embodiment, based on identifying that the input utterance corresponds to the cached utterance based on operation 1005, the electronic device 100 may increase the hit count corresponding to the cached input utterance. The electronic device 100 may transmit the input utterance to the intelligent server 200 so that the intelligent server 200 processes the input utterance. The electronic device 100 may obtain a latency generated by processing the input utterance based on operation 1003. The electronic device 100 may change the latency corresponding to the cached input utterance based on the obtained latency. In one embodiment, the electronic device 100 may obtain (or calculate) a latency corresponding to the cached input utterance and a representative value (e.g., an intermediate value, a minimum value, or an average value) of the obtained latency. The electronic device 100 may update the latency corresponding to the cached utterance, thereby enhancing reliability of the operation of identifying whether the utterance is to be processed by the intelligent server 200.

Figure 11:
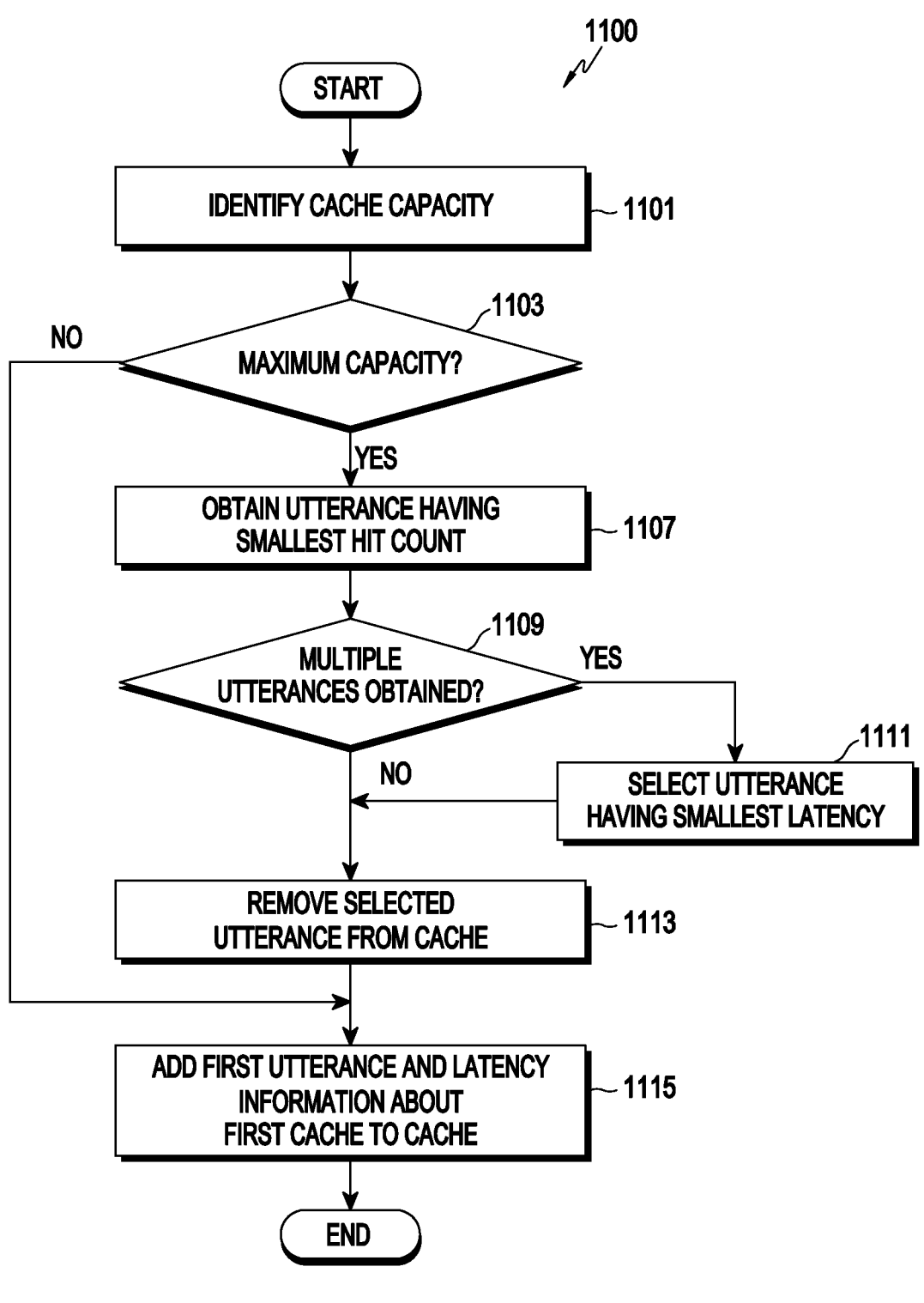
FIG. 11 is a flowchart illustrating an operation of selecting an utterance to be removed from an utterance cache based on identifying that a size of the utterance cache reaches the maximum capacity by an electronic device according to an embodiment of the disclosure.

FIG. 11 is a flowchart illustrating an operation, performed by an electronic device (e.g., the user terminal 100 of FIG. 1), of selecting an utterance to be removed from the utterance cache 510, based on identification that a size of an utterance cache (e.g., the utterance cache 510 of FIG. 5) has reached a maximum capacity, according to an embodiment of the disclosure.

In an embodiment, the operations shown in FIG. 11 are not limited to the shown order but may rather be performed in other various orders. In one embodiment, the order of the operations may be changed, and at least two operations may be performed in parallel. According to an embodiment, more or less operations than those of FIG. 11 may be performed.

In FIG. 11, in operation 1101, in an embodiment, the electronic device 100 (e.g., the processor 160 of FIG. 1) may identify the capacity of the utterance cache 510.

In an embodiment, the electronic device 100 may identify the size of the memory occupied by the utterance cache 510 of the total size of the memory (e.g., the memory 150 of FIG. 5). A detailed description of how the electronic device 100 identifies the memory size of the storage space is omitted.

In operation 1103, in an embodiment, the electronic device 100 may identify whether the size of the utterance cache 510 has reached the maximum capacity.

In an embodiment, the electronic device 100 may identify whether a memory size occupied by the utterance cache 510 reaches a preset maximum capacity. In an embodiment, before adding the input utterance to the utterance cache 510, the electronic device 100 may identify the memory size occupied by the utterance cache 510. In an embodiment, the electronic device 100 may identify the memory size occupied by the utterance cache 510 at a preset period.

In operation 1115, in an embodiment, based on identifying that the memory size of the utterance cache 510 does not reach the maximum capacity ("NO" in operation 1103), the electronic device 100 may add the input utterance and latency information about the input utterance to the utterance cache 510. In an embodiment, the electronic device 100 may store the input utterance and the latency information about the input utterance in the utterance cache 510, based on identifying that the memory of utterance cache 510 is not filled to the maximum capacity.

In an embodiment, the electronic device 100 may select one of the one or more cached utterances, based on identifying ("YES" in operation 1103) that the size of the utterance cache 510 has reached the maximum capacity.

In operation 1107, in an embodiment, the electronic device 100 may obtain (or identify) an utterance having the smallest hit count from the cached utterances, based on identifying ("YES" in operation 1103) that the size of the utterance cache 510 has reached the maximum capacity.

In an embodiment, based on identifying that the size of the utterance cache 510 reaches the maximum capacity, the electronic device 100 may obtain the utterance having the smallest hit count among the one or more cached utterances. In an embodiment, the electronic device 100 may obtain at least one utterance having the smallest hit count by traversing the utterance cache 510.

In operation 1109, in an embodiment, the electronic device 100 may identify whether a plurality of utterances having the smallest hit count are obtained.

In an embodiment, the electronic device 100 may identify the number of at least one utterance having the smallest obtained hit count. The electronic device 100 may identify whether there are several utterances having the smallest hit count. In an embodiment, the electronic device 100 may select the obtained utterance, based on identifying that the number of utterances having the smallest hit count is only one ("NO" in operation 1109). The electronic device 100 may determine the utterance having the lowest utterance frequency by selecting the utterance having the lowest hit count.

In operation 1111, in an embodiment, the electronic device 100 may select an utterance having the lowest latency from among the plurality of utterances having the smallest hit count, based on obtaining the plurality of utterances having the smallest hit count.

In an embodiment, the electronic device 100 may identify a latency corresponding to each of the cached utterances, based on identifying that there are several utterances having a low utterance frequency of the user. The electronic device 100 may select an utterance having the lowest latency from among utterances having the lowest hit count. In an embodiment, the electronic device 100 may generate the linear combination score of the hit count and the latency score for each utterance in the utterance cache. The electronic device 100 may select an utterance having the lowest score from among the one or more utterances as an utterance to be removed. By selecting the utterance having the lowest latency, the electronic device 100 may reduce an increase in latency caused by executing an on-device NLU module (e.g., the on-device NLU module 520 of FIG. 5) even when the selected utterance is removed from the utterance cache 510.

In operation 1113, in an embodiment, the electronic device 100 may remove the selected utterance from the utterance cache 510.

In an embodiment, the electronic device 100 may remove the utterance having the smallest hit count from the utterance cache 510, based on obtaining the only utterance having the smallest hit count ("NO" in operation 1109). In an embodiment, the electronic device 100 may remove the selected utterance from the utterance cache 510, based on selecting (operation 1111) the utterance having the lowest latency from among the plurality of utterances having the lowest hit count. In an embodiment, the electronic device 100 may remove the selected utterance from the utterance cache 510, based on selection (operation 1111) of the utterance having the lowest linear combination score. In an embodiment, the operation of removing the selected utterance from the utterance cache 510 may be referred to as "cache eviction". In an embodiment, after removing the selected utterance from the utterance cache 510, the electronic device 100 may add (operation 1105) the input utterance and latency information about the input utterance to the utterance cache 510. In an embodiment, the electronic device 100 may reduce the latency generated by identifying whether the input utterance corresponds to the cached utterance based on the utterance cache 510, by maintaining the memory size occupied by the utterance cache 510 to be less than the maximum capacity.

Figure 12:
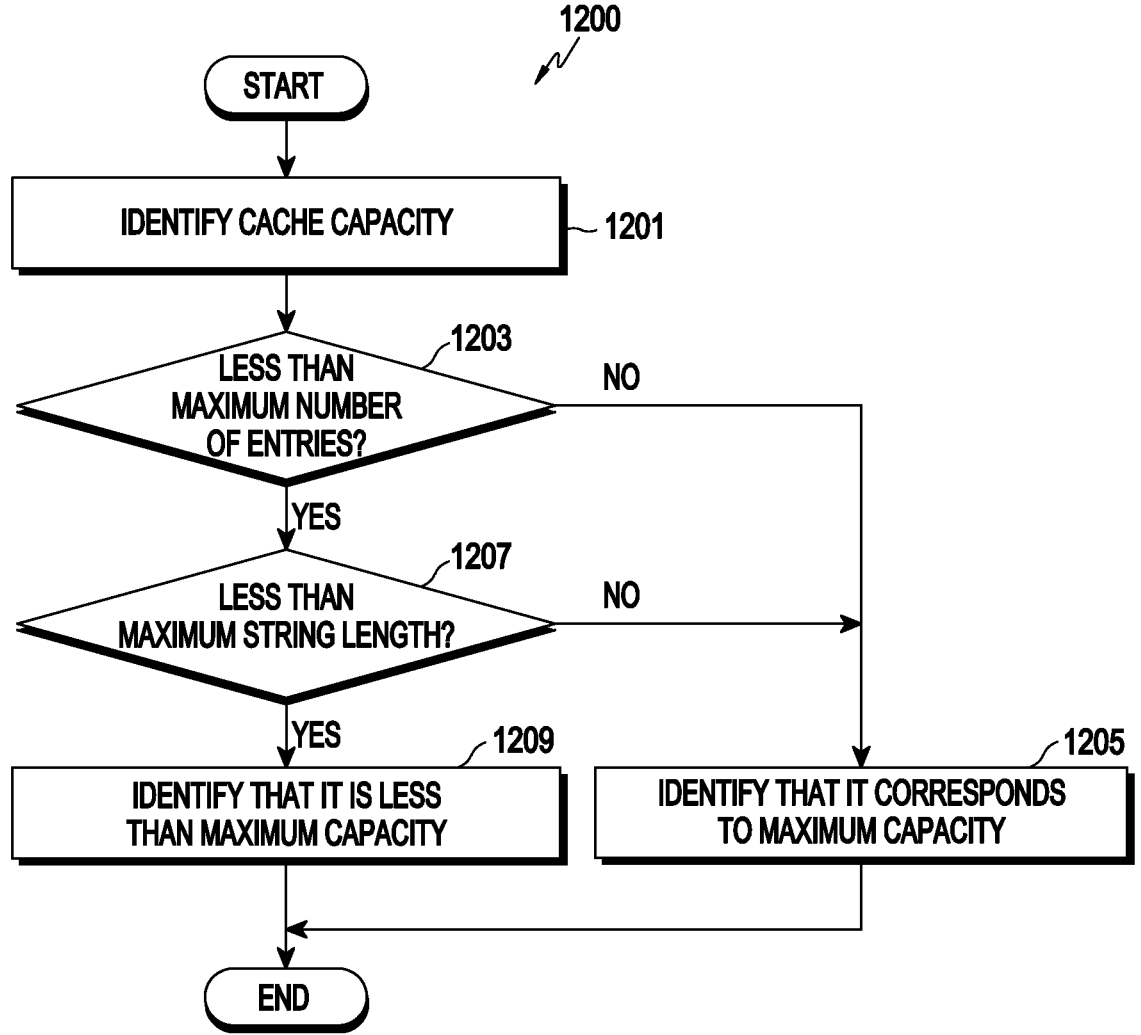
FIG. 12 is a flowchart illustrating an operation of identifying whether a size of an utterance cache reaches the maximum capacity by an electronic device according to an embodiment of the disclosure.

FIG. 12 is a flowchart 1200 illustrating an operation, performed by an electronic device (e.g., the user terminal 100 of FIG. 1), of identifying whether a size of an utterance cache (e.g., the utterance cache 510 of FIG. 5) has reached a maximum capacity, according to an embodiment.

In an embodiment, the operations shown in FIG. 12 are not limited to the shown order but may rather be performed in other various orders. In one embodiment, the order of the operations may be changed, and at least two operations may be performed in parallel. According to an embodiment, more or less operations than those of FIG. 12 may be performed.

In an embodiment, the electronic device 100 may identify whether the size of the utterance cache 510 reaches a maximum capacity based on at least one of whether the number of the one or more cached utterances is less than a maximum number of entries and whether a cumulative string length for the one or more cached utterances is less than a maximum string length.

In FIG. 12, in operation 1201, in an embodiment, the electronic device 100 (e.g., the processor 160 of FIG. 1) may identify the capacity of the utterance cache 510. Since operation 1201 is at least partially the same or similar to the operation 1101, no detailed description thereof is presented below.

In operation 1203, in an embodiment, the electronic device 100 may identify whether the number of utterances cached in the utterance cache 510 is less than the maximum number of entries.

In an embodiment, the electronic device 100 may identify whether the number of one or more cached utterances is less than a preset maximum number of entries. The electronic device 100 may maintain the number of one or more cached utterances to be less than a preset maximum number of entries, thereby reducing latency generated by traversing the cached utterances. In an embodiment, the maximum number of entries may be pre-stored in metadata.

In operation 1205, in an embodiment, the electronic device 100 may identify that the size of the utterance cache 510 has reached the maximum capacity, based on identifying that the number of cached utterances is larger than or equal to the maximum number of entries ("NO" in operation 1203).

In an embodiment, based on identifying that the size of the utterance cache 510 has reached the maximum capacity, the electronic device 100 may remove any one of the one or more cached utterances from the utterance cache 510. An operation, performed by the electronic device 100, of removing any one of the one or more utterances cached from the utterance cache 510 has been described in operations 1107 to 1113, and thus a detailed description thereof will be omitted.

In operation 1207, in an embodiment, the electronic device 100 may identify whether the cumulative string length for the cached utterances is less than the maximum string length, based on identifying that the number of cached utterances is less than the maximum number of entries ("YES" in operation 1203).

In an embodiment of the disclosure, the electronic device 100 may obtain (or calculate) the cumulative string length by summing the respective string lengths of the cached utterances. The electronic device 100 may identify that the size of the utterance cache 510 has reached the maximum capacity (operation 1205), based on identifying that the cumulative string length is larger than or equal to the maximum string length ("NO" in operation 1207). In an embodiment, the maximum string length may be previously stored in metadata.

In operation 1209, in an embodiment, the electronic device 100 may identify that the utterance cache 510 is less than the maximum capacity, based on identifying that the cumulative string length for the cached utterances is less than the maximum string length ("YES" in operation 1207).

In an embodiment of the disclosure, the electronic device 100 may reduce latency generated by comparing the string corresponding to the input utterance with the string corresponding to each of the cached utterances, based on the utterance cache 510, by maintaining the cumulative string length to be less than the maximum string length.

According to an embodiment of the disclosure, an electronic device 100 or 411 may be configured to comprise a communication interface 110 or 490, memory 150 or 430 including an utterance cache 510, and at least one processor 160 or 420 operatively connected to the communication interface 110 or 490.

The at least one processor 160 or 420 may be configured to identify whether an input utterance corresponds to one or more cached utterances. The at least one processor 160 or 420 may be configured to transmit the input utterance to an external electronic device 200 or 418 through the communication interface 110 or 490 based on identifying that the input utterance corresponds to one of the one or more cached utterances. The at least one processor 160 or 420 may be configured to identify whether an operation corresponding to the input utterance is executable by the electronic device 100 or 411. The at least one processor 160 or 420 may be configured to execute the operation based on identifying that the operation is executable by the electronic device 100 or 411. The at least one processor 160 or 420 may be configured to transmit the input utterance to the external electronic device 200 or 418 through the communication interface 110 or 490 and add the input utterance to an utterance cache 510 based on identifying that the operation is not executable by the electronic device 100 or 411.

In an embodiment, the at least one processor 160 or 420 may be further configured to obtain a speech utterance. The at least one processor 160 or 420 may be further configured to convert the speech utterance into the input utterance in text form. The at least one processor 160 or 420 may be further configured to pre-process the converted input utterance.

In an embodiment, the at least one processor 160 or 420 may be further configured to increase hit count corresponding to the input utterance based on identifying that the input utterance corresponds to the one or more cached utterances.

In an embodiment, the at least one processor 160 or 420 may be further configured to obtain latency information related to a time taken to identify that the operation corresponding to the input utterance is not executable by the electronic device 100 or 411. The at least one processor 160 or 420 may be further configured to add the latency information about the input utterance to the utterance cache 510.

In an embodiment, the at least one processor 160 or 420 may be further configured to identify the operation corresponding to the input utterance. The at least one processor 160 or 420 may be further configured to change the latency information about the input utterance based on identifying that the operation corresponding to the input utterance is not executable by the electronic device 100 or 411, and the input utterance corresponds to a cached utterance.

In an embodiment, the at least one processor 160 or 420 may be further configured to identify whether a size of the utterance cache 510 reaches a maximum capacity. The at least one processor 160 or 420 may be further configured to select one of the one or more cached utterances based on identifying that the size of the utterance cache 510 reaches the maximum capacity. The at least one processor 160 or 420 may be further configured to remove the selected utterance from the utterance cache 510.

In an embodiment, the at least one processor 160 or 420 may be configured to, as at least part of selecting one of the one or more cached utterances, select an utterance having a smallest hit count from among the one or more cached utterances based on identifying that the size of the utterance cache 510 reaches a maximum capacity.

In an embodiment, the at least one processor 160 or 420 may be configured to, as at least part of selecting one of the one or more cached utterances, select an utterance having a lowest latency from among one or more utterances having a smallest hit count based on obtaining the one or more utterances having the smallest hit count.

In an embodiment, the at least one processor 160 or 420 may be configured to, as at least part of identifying whether the size of the utterance cache 510 reaches a maximum capacity, identify whether a size of the utterance cache 510 reaches a maximum capacity based on at least one of whether a number of the one or more cached utterances is less than a maximum number of entries or whether a cumulative string length for the one or more cached utterances is less than a maximum string length.

In an embodiment, the utterance cache 510 may include one or more cached utterances, hit counts respectively corresponding to the cached utterances, and latency information respectively corresponding to the cached utterances.

According to an embodiment of the disclosure, a method for analyzing a user utterance by an electronic device 100 or 411 may comprise identifying whether an input utterance corresponds to one or more cached utterances. The method may comprise transmitting the input utterance to an external electronic device 200 or 418 through a communication interface 110 or 490 of the electronic device 100 or 411 based on identifying that the input utterance corresponds to one of the one or more cached utterances. The method may comprise identifying whether an operation corresponding to the input utterance is executable by the electronic device 100 or 411. The method may comprise executing the operation based on identifying that the operation is executable by the electronic device 100 or 411. The method may comprise transmitting the input utterance to the external electronic device 200 or 418 through the communication interface 110 or 490 and add the input utterance to an utterance cache 510 based on identifying that the operation is not executable by the electronic device 100 or 411.

In an embodiment, the method may further comprise obtaining a speech utterance. The method may further comprise converting the speech utterance into the input utterance in text form. The method may further comprise pre-processing the converted input utterance.

In an embodiment, the method may further comprise increasing a hit count corresponding to the input utterance based on identifying that the input utterance corresponds to the one or more cached utterances.

In an embodiment, in the method may further comprise obtaining latency information related to a time taken to identify that the operation corresponding to the input utterance is not executable based on identifying that the operation corresponding to the input utterance is not executable by the electronic device 100 or 411. The method may further comprise adding the latency information about the input utterance to the utterance cache 510.

In an embodiment, the method may further comprise identifying an operation corresponding to the input utterance. The method may further comprise changing the latency information about the input utterance based on identifying that the operation corresponding to the input utterance is not executable by the electronic device 100 or 411, and the input utterance corresponds to a cached utterance.

In an embodiment, the method may further comprise identifying whether a size of the utterance cache 510 reaches the maximum capacity. The method may further comprise selecting one of the one or more cached utterances based on identifying that the size of the utterance cache (510) reaches the maximum capacity. The method may further comprise removing the selected utterance from the utterance cache 510.

In an embodiment, in the method, selecting any one of the one or more cached utterances may include selecting an utterance having a smallest hit count from among the one or more cached utterances based on identifying that the size of the utterance cache 510 reaches a maximum capacity.

In an embodiment, in the method, selecting any one of the one or more cached utterances may include selecting an utterance having a lowest latency from among one or more utterances having a smallest hit count based on obtaining the one or more utterances having the smallest hit count.

In an embodiment, in the method, identifying whether the utterance cache 510 reaches the maximum capacity may include identifying whether a size of the utterance cache 510 reaches a maximum capacity based on at least one of whether the number of the one or more cached utterances is less than a maximum number of entries or whether a cumulative string length for the one or more cached utterances is less than a maximum string length.

In an embodiment, in the method, the utterance cache 510 may include one or more cached utterances, hit counts respectively corresponding to the one or more cached utterances, and latency information respectively corresponding to the one or more cached utterances.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 440) including one or more instructions that are stored in a storage medium (e.g., internal memory 436 or external memory 438) that is readable by a machine (e.g., the electronic device 411). For example, a processor (e.g., the processor 420) of the machine (e.g., the electronic device 411) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store℠), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

Example embodiments of the disclosure have been described above. The above-described embodiments are merely examples, and it will be appreciated by one of ordinary skill in the art various changes may be made thereto without departing from the scope of the disclosure. Therefore, the disclosed embodiments should be considered from an illustrative, rather than a limiting, point of view. The scope of the invention is indicated in the claims rather than in the above-described description. All differences within the equivalent range should be construed as being included in the disclosure.

What is claimed is:

1. An electronic device comprising:
a communication interface;
memory storing instructions; and
at least one processor operatively connected to the communication interface and the memory,
wherein the instructions, when executed by the at least one processor individually or collectively, cause the electronic device to:
identify whether first text data corresponding to an input utterance corresponds to text data stored in the memory;
based on identifying that the first text data corresponding to the input utterance corresponds to the text data stored in the memory, transmit, through the communication interface, the first text data corresponding to the input utterance to an external server;
identify whether an operation corresponding to the input utterance is executable by the electronic device;
based on identifying that the operation is executable by the electronic device, execute the operation; and
based on identifying that the operation is not to be executable by the electronic device, transmit the first text data corresponding to the input utterance to the external server through the communication interface and add the first text data corresponding to the input utterance to the memory,
wherein the electronic device is a client device that is operatively connected with the external server.

2. The electronic device of claim 1, wherein the instructions cause the electronic device to, based on identifying that the first text data corresponding to the input utterance corresponds to the text data stored in the memory, increase a hit count corresponding to the input utterance.

3. The electronic device of claim 2, wherein the instructions cause the electronic device to:

obtain latency information corresponding to a time period taken to identify that the operation corresponding to the input utterance is not executable by the electronic device; and add the latency information about the operation corresponding to the input utterance to the memory.

4. The electronic device of claim 3, wherein the instructions cause the electronic device to:

identify the operation corresponding to the input utterance; and based on identifying that the operation corresponding to the input utterance is not executable by the electronic device and that the first text data corresponding to the input utterance corresponds to second text data among the text data stored in the memory change the latency information about the operation corresponding to the input utterance.

5. The electronic device of claim 4, wherein the instructions cause the electronic device to:

identify whether a size of the memory reaches a maximum capacity;

based on identifying that the size of the memory reaches the maximum capacity, select third text data among the text data stored in the memory; and remove the selected third data from the memory.

6. The electronic device of claim 5, wherein the instructions cause the electronic device to:

select the third text data by selecting at least one utterance having a smallest hit count from among the text data stored in the memory.

7. The electronic device of claim 6, wherein the instructions cause the electronic device to:

identify whether there are at least two utterances having the smallest hit count among the text data stored in the memory; and select an utterance having a lowest latency from among the at least two utterances having the smallest hit count.

8. The electronic device of claim 7, wherein the instructions cause the electronic device to:

identify whether the size of the memory reaches the maximum capacity based on at least one of whether a number of the text data stored in the memory is less than a maximum number of entries or whether a cumulative string length for the text data stored in the memory is less than a maximum string length.

9. The electronic device of claim 8, wherein the memory further stores at least one of hit count information corresponding to the text data stored in the memory or latency information corresponding to the text data stored in the memory.

10. A method for analyzing a user utterance by an electronic device, the method comprising:

identifying whether first text data corresponding to an input utterance corresponds to text data stored in memory;

based on identifying that the first text data corresponding to the input utterance corresponds to the text data stored in the memory, transmitting the first text data corresponding to the input utterance to an external server through a communication interface of the electronic device;

identifying whether an operation corresponding to the input utterance is executable by the electronic device;

based on identifying that the operation is executable by the electronic device, executing the operation; and based on identifying that the operation is not executable by the electronic device, transmitting the first text data corresponding to the input utterance to the external server through the communication interface and adding the first text data corresponding to the input utterance to the memory, wherein the electronic device is a client device that is operatively connected with the external server.

11. The method of claim 10, further comprising, based on identifying that the first text data corresponding to the input utterance corresponds to the text data stored in the memory, increasing a hit count corresponding to the input utterance.

12. The method of claim 11, further comprising:

based on identifying that the operation corresponding to the input utterance is not executable by the electronic device, obtaining latency information corresponding to a time taken to identify that the operation corresponding to the input utterance is not executable; and adding the latency information about the operation corresponding to the input utterance to the memory.

13. The method of claim 12, further comprising:

identifying the operation corresponding to the input utterance; and based on identifying that the operation corresponding to the input utterance is not executable by the electronic device and that the first text data corresponding to the input utterance corresponds to second text data stored in the memory, changing latency information about the first text data corresponding to the input utterance.

14. The method of claim 13, further comprising:

identifying whether a size of the memory reaches a maximum capacity;

based on identifying that the size of the memory reaches the maximum capacity, selecting third text data from the memory; and removing, from the memory, the selected third text data corresponding to at least one utterance.

15. The method of claim 14, further comprising:

selecting the third text data corresponding to the at least one utterance in the memory by selecting the at least one utterance having a smallest hit count from among the text data stored in the memory.

16. The method of claim 15, further comprising:

identifying whether there are at least two utterances having the smallest hit count among the text data stored in the memory; and selecting an utterance having a lowest latency from among the at least two utterances having the smallest hit count.

17. The method of claim 16, further comprising:

identifying whether the size of the first text data in the memory reaches the maximum capacity based on at least one of whether a number of the text data stored in the memory is less than a maximum number of entries or whether a cumulative string length for the text data stored in the memory is less than a maximum string length.

18. The method of claim 17, wherein the memory further stores at least one of hit count information corresponding to the text data stored in the memory and latency information corresponding to the text data stored in the memory.

* * * * *